United States Patent
Choi et al.

(10) Patent No.: US 11,991,662 B2
(45) Date of Patent: May 21, 2024

(54) POSITIONING REFERENCE SIGNAL ADAPTATION IN DISTRIBUTED RANGING SYSTEM

(71) Applicant: QUALCOMM Incorporated, San Diego, CA (US)

(72) Inventors: Chang-Sik Choi, Seoul (KR); Kapil Gulati, Belle Mead, NJ (US); Gene Wesley Marsh, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 200 days.

(21) Appl. No.: 17/161,343

(22) Filed: Jan. 28, 2021

(65) Prior Publication Data
US 2022/0240218 A1    Jul. 28, 2022

(51) Int. Cl.
*H04W 64/00* (2009.01)
*G01S 5/02* (2010.01)

(52) U.S. Cl.
CPC ......... *H04W 64/006* (2013.01); *G01S 5/0205* (2013.01)

(58) Field of Classification Search
CPC ..... H04W 64/00; H04W 4/023; H04W 4/029; H04W 4/02; H04W 4/46; H04W 64/003; H04W 56/00; H04W 4/027; H04W 12/63; H04W 4/024; H04W 36/0061; H04W 4/026; H04W 56/002; H04W 4/80; H04W 56/001; H04W 28/18; H04B 1/7163; H04B 1/7183; H04B 1/7172; H04B 1/71635; H04B 1/717; H04B 5/02
See application file for complete search history.

(56) References Cited

U.S. PATENT DOCUMENTS

| 2013/0044612 | A1 | 2/2013 | Hirsch |
| 2019/0221110 | A1 | 7/2019 | Vanderveen et al. |
| 2020/0041603 | A1* | 2/2020 | Stephens .................. G01S 5/12 |
| 2020/0280952 | A1* | 9/2020 | Sasoglu ............. H04W 64/006 |

(Continued)

FOREIGN PATENT DOCUMENTS

| WO | WO-2017023474 A1 | 2/2017 |
| WO | WO-2018106467 A1 | 6/2018 |

OTHER PUBLICATIONS

International Search Report and Written Opinion—PCT/US2021/061591—ISA/EPO—dated Apr. 5, 2022.

*Primary Examiner* — Kwasi Karikari
(74) *Attorney, Agent, or Firm* — QUALCOMM Incorporated

(57) ABSTRACT

Multiple user equipments (UEs) may initiate independent ranging sessions at nearly the same time and location and which may interfere with each other. A UE that receives multiple initial messages for ranging determines if there is temporal separation between the ranging sessions. The UE may further determine if there is geographic separation between the ranging sessions, e.g., the initiating UEs are separated. If separation is lacking, the UE separates available ranging signal properties, such as frequency bandwidth, timing instances, and identifiers, and communicates different sets of ranging signal properties to each initiating UE. The multiple ranging sessions may be performed using the different sets of ranging signal properties with less risk of interference.

39 Claims, 8 Drawing Sheets

(56) References Cited

U.S. PATENT DOCUMENTS

| 2020/0359354 A1* | 11/2020 | Lee | G01S 11/02 |
| 2021/0076349 A1* | 3/2021 | Ioffe | H04W 64/006 |
| 2022/0013013 A1* | 1/2022 | Chen | G07C 9/00309 |

* cited by examiner

POSITIONING REFERENCE SIGNAL ADAPTATION IN DISTRIBUTED RANGING SYSTEM

BACKGROUND

Background Field

The subject matter disclosed herein relates to wireless communications systems, and more particularly to methods and apparatuses for ranging or positioning of a user equipment in a distributed wireless communications system.

Relevant Background

Obtaining accurate position information for user equipment, such as cellular telephones or other wireless communication devices, is becoming prevalent in the communications industry. For example, obtaining highly accurate locations of vehicles or pedestrians is essential for autonomous vehicle driving and pedestrian safety applications.

A common means to determine the location of a device is to use a satellite positioning system (SPS), such as the well-known Global Positioning Satellite (GPS) system or Global Navigation Satellite System (GNSS), which employ a number of satellites that are in orbit around the Earth. In certain scenarios, however, location determination signals from an SPS may be unreliable or unavailable, e.g., during adverse weather conditions or in areas with poor satellite signal reception such as tunnels or parking complexes. Moreover, position information generated using SPS is prone to imprecision. For example, off-the-shelf GPS positioning devices have an accuracy of a few meters, which is not optimal to ensure safe autonomous driving and navigation.

Coordinated or automated driving requires communications between vehicles, which may be direct or indirect, e.g., via an infrastructure component such as a roadside unit (RSU). For vehicle safety applications, both positioning and ranging are important. For example, vehicle user equipments (UEs) may perform positioning and ranging using sidelink signaling, e.g., broadcasting ranging signals for other vehicle UEs or pedestrian UEs to determine the relative location of the transmitter. An accurate and timely knowledge of the relative locations or ranges to nearby vehicles, enables automated vehicles to safely maneuver and negotiate traffic conditions. Round trip time (RTT), for example, is a technique commonly used for determining a range between transmitters. RTT is a two-way messaging technique in which the time between sending a signal from a first device to receiving an acknowledgement from a second device (minus processing delays) corresponds to the distance (range) between the two devices. Where multiple nearby UEs are attempting to perform independent positioning sessions at the same time, interference may occur. Accordingly, improvements are desirable to reduce possible interference between separate positioning sessions.

SUMMARY

Multiple user equipments (UEs) may initiate independent ranging sessions at nearly the same time and location and which may interfere with each other. A UE that receives multiple initial messages for ranging determines if there is temporal separation between the ranging sessions. The UE may further determine if there is geographic separation between the ranging sessions, e.g., the initiating UEs are separated. If separation is lacking, the UE separates available ranging signal properties, such as frequency bandwidth, timing instances, and identifiers, and communicates different sets of ranging signal properties to each initiating UE. The multiple ranging sessions may be performed using the different sets of ranging signal properties with less risk of interference.

In one implementation, a method of ranging between user equipments (UEs) performed by a receiving UE, includes receiving a first initial message from a first UE to initiate a first ranging session; receiving a second initial message from a second UE to initiate a second ranging session; determining that a temporal separation between the first ranging session and the second ranging session is less than a predetermined time threshold; separating available ranging signal properties into a first set for the first ranging sessions and a second set for the second ranging session, wherein the first set of ranging signal properties and the second set of ranging signal properties are different; transmitting a first response messages to the first UE comprising the first set of ranging signal properties and a second response message to the second UE comprising the second set of ranging signal properties; and performing the first ranging session with the first UE using the first set of ranging signal properties and the second ranging session with the second UE using the second set of ranging signal properties.

In one implementation, a user equipment (UE) configured for ranging between UEs, the UE includes a wireless transceiver configured to wirelessly communicate with entities in a wireless network; at least one memory; and at least one processor coupled to the wireless transceiver and the at least one memory, wherein the at least one processor is configured to: receive a first initial message from a first UE to initiate a first ranging session; receive a second initial message from a second UE to initiate a second ranging session; determine that a temporal separation between the first ranging session and the second ranging session is less than a predetermined time threshold; separate available ranging signal properties into a first set for the first ranging sessions and a second set for the second ranging session, wherein the first set of ranging signal properties and the second set of ranging signal properties are different; transmit a first response messages to the first UE comprising the first set of ranging signal properties and a second response message to the second UE comprising the second set of ranging signal properties; and perform the first ranging session with the first UE using the first set of ranging signal properties and the second ranging session with the second UE using the second set of ranging signal properties.

In one implementation, a user equipment (UE) configured for ranging between UEs, the UE includes means for receiving a first initial message from a first UE to initiate a first ranging session; means for receiving a second initial message from a second UE to initiate a second ranging session; means for determining that a temporal separation between the first ranging session and the second ranging session is less than a predetermined time threshold; means for separating available ranging signal properties into a first set for the first ranging sessions and a second set for the second ranging session, wherein the first set of ranging signal properties and the second set of ranging signal properties are different; means for transmitting a first response messages to the first UE comprising the first set of ranging signal properties and a second response message to the second UE comprising the second set of ranging signal properties; and means for performing the first ranging session with the first UE using the first set of ranging signal properties and the second ranging session with the second UE using the second set of ranging signal properties.

In one implementation, a non-transitory storage medium including program code stored thereon, the program code is operable to configure at least one processor in a user equipment (UE) for ranging between UEs, includes program code to receive a first initial message from a first UE to initiate a first ranging session; program code to receive a second initial message from a second UE to initiate a second ranging session; program code to determine that a temporal separation between the first ranging session and the second ranging session is less than a predetermined time threshold; program code to separate available ranging signal properties into a first set for the first ranging sessions and a second set for the second ranging session, wherein the first set of ranging signal properties and the second set of ranging signal properties are different; program code to transmit a first response messages to the first UE comprising the first set of ranging signal properties and a second response message to the second UE comprising the second set of ranging signal properties; and program code to perform the first ranging session with the first UE using the first set of ranging signal properties and the second ranging session with the second UE using the second set of ranging signal properties.

In one implementation, a method of ranging between user equipments (UEs) performed by an initiating UE, includes sending a first initial message to a first UE to initiate a first ranging session, the first initial message indicating ranging signal properties for the first ranging session; receiving a response message from the first UE comprising a set of ranging signal properties that is different than the ranging signal properties indicated in the first initial message and that will be used during the first ranging session; and performing the first ranging session with the first UE using the set of ranging signal properties.

In one implementation, a user equipment (UE) configured for ranging between UEs, the UE includes a wireless transceiver configured to wirelessly communicate with entities in a wireless network; at least one memory; and at least one processor coupled to the wireless transceiver and the at least one memory, wherein the at least one processor is configured to: send a first initial message to a first UE to initiate a first ranging session, the first initial message indicating ranging signal properties for the first ranging session; receive a response message from the first UE comprising a set of ranging signal properties that is different than the ranging signal properties indicated in the first initial message and that will be used during the first ranging session; and perform the first ranging session with the first UE using the set of ranging signal properties.

In one implementation, a user equipment (UE) configured for ranging between UEs, the UE includes means for sending a first initial message to a first UE to initiate a first ranging session, the first initial message indicating ranging signal properties for the first ranging session; means for receiving a response message from the first UE comprising a set of ranging signal properties that is different than the ranging signal properties indicated in the first initial message and that will be used during the first ranging session; and means for performing the first ranging session with the first UE using the set of ranging signal properties.

In one implementation, a non-transitory storage medium including program code stored thereon, the program code is operable to configure at least one processor in a user equipment (UE) for ranging between UEs, includes program code to send a first initial message to a first UE to initiate a first ranging session, the first initial message indicating ranging signal properties for the first ranging session; program code to receive a response message from the first UE comprising a set of ranging signal properties that is different than the ranging signal properties indicated in the first initial message and that will be used during the first ranging session; and program code to perform the first ranging session with the first UE using the set of ranging signal properties.

BRIEF DESCRIPTION OF THE DRAWING

Non-limiting and non-exhaustive aspects are described with reference to the following figures, wherein like reference numerals refer to like parts throughout the various figures unless otherwise specified.

DETAILED DESCRIPTION

Figure 1:
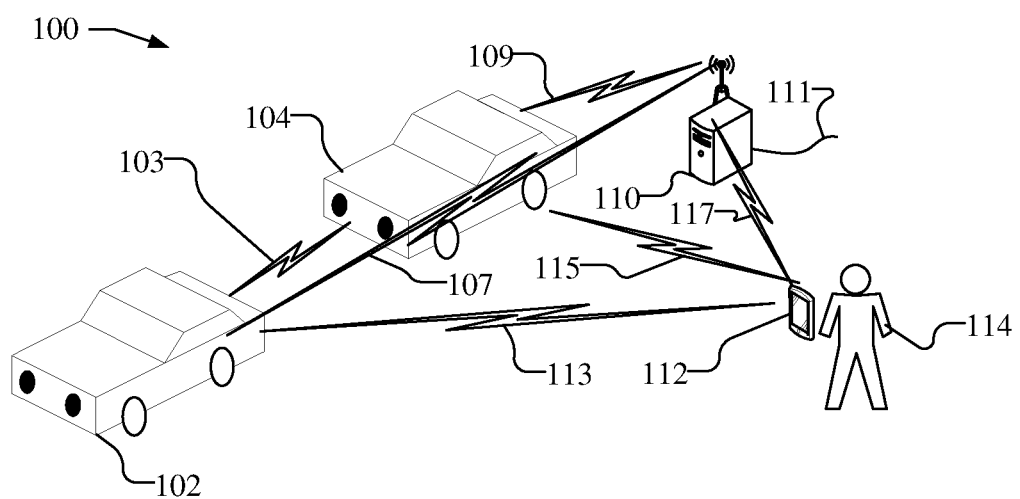
FIG. 1 illustrates a wireless communication system illustrating distributed UE communications, including ranging signaling to support multiple ranging sessions.

A distributed approach may be used for ranging and positioning of vehicles, roadside units (RSU), and pedestrian and may avoid the need for a centralized base station to coordinate and relay communications. Such communications may be used, for example, for automated driving and vehicle safety applications. Communications used in a distributed approach may be made directly, e.g., between vehicles, or between vehicles and a RSU or pedestrian. These communications may include messaged and information elements (IEs) with which a vehicle may provide information necessary for automated driving For example, for safe operation of autonomous vehicles, the relative locations or ranges to other vehicles needs to be determined. Various approaches may be used to derive the relative positions between vehicles. For example, relative positions of vehicles may be derived using ranging signaling. Ranging signals are sometimes referred to as physical ranging signals, positioning ranging signals, positioning reference signals, or physical referencing signals, and may be collectively referred to herein as PRS signals. PRS signals, for example, may be broadcast by a user equipment (UE) in a vehicle, sometimes referred to as V-UE, and received by other V-UEs and/or infrastructure, e.g., RSU, or UEs held by a pedestrian, using direct communication systems, such as dedicated short-range communication (DSRC), cellular Vehicle-to-Everything (C-V2X) communication, and even 5G New Radio (NR) communications. PRS signals are used to determine a range to the broadcasting vehicle, e.g., using one way ranging, round-trip-time (RTT) positioning operations, or other standard positioning operations such as time of arrival (TOA), time difference of arrival (TDOA) or observed time difference of arrival (OT-DOA).

In a distributed system, an individual UE is able to range with respect to other UEs that are nearby using messages and positioning signals that are transmitted directly to the other UEs. In an RTT-based ranging session, for example, multiple messages and signals are transmitted and received by each UE. For example, an initial set of pre-ranging signal messages (pre-PRS messages) are transmitted and received to request and accept a ranging session, followed by broadcasting the ranging signals (PRS signals) for measurement, which is followed by a set of post-ranging signal messages (post-PRS messages) that exchange measurement payloads. For RTT-based ranging and positioning, for example, the time of arrival (TOA) and time of departure (TOD) measurements of transmitted and received PRS signals may be provided in the post-PRS messages and used by each pair UE to determine the range between the UEs. The pre-PRS and post-PRS messages may be sent over a licensed spectrum to guarantee reliability, while the PRS signals may be broadcast over an unlicensed spectrum (e.g., to enjoy a larger available bandwidth in e.g., UNI-III spectrum).

The distributed mechanism ensures a minimum overhead, but multiple nearby UEs may initiate separate ranging sessions independently of each other. For example, without overhead communications to control ranging sessions, two UE may separately broadcast their own pre-PRS signals to the same set of responder UEs resulting in two independent ranging sessions that include the same responder UEs and that occur at the same time. Pre-optimization of a ranging sessions is not feasible in dynamic areas, and consequently, the two nearby ranging sessions are separately treated. The two nearby ranging sessions may interfere with each other, e.g., in frequency, or in each other's listen-before-transmit (LBT) procedure or interfere with each other's post-PRS measurement observations. If interference occurs, the accuracy of the RTT based ranging session may be significantly reduced.

To reduce the chance of interference between multiple ranging sessions, a UE that receives requests to initiate ranging sessions from multiple UEs, e.g., within a threshold time threshold or distance threshold, may divide available ranging signal properties by the number of total initiating UEs. The available ranging signal properties, for example, may include one or more of frequency bandwidth, PRS timing instances, and PRS identifiers or a combination thereof. The receiving UE may respond to each initiating UE by accepting the ranging session and providing the assigned portion of the ranging signal properties to each respective initiating UE.

By dividing the ranging signal properties amongst the initiating UEs, the separate ranging sessions may be performed with little chance of interference between them. Advantageously, with the process of dividing ranging signal properties amongst initiating UEs, existing ranging procedures, such as distributed RTT-based positioning, may minimize or eliminate interference without requiring additional signaling overhead, and will have improved LBT efficiency when LBT is channel specific, which will improve ranging/positioning accuracy due to the reduced inter-PRS time.

Further, the process may be employed only when interference is likely to occur, e.g., if the initiating messages are close in time or the initiating vehicles are close in space.

FIG. 1 illustrates a wireless communication system 100 illustrating distributed communications, including ranging signaling to support multiple ranging sessions and/or positioning, as described herein. Wireless communication system 100 illustrates a first vehicle 102 with a first wireless device, e.g., V-UE 102, in wireless communications with another V-UE 104, illustrated as a second vehicle. The V-UE 102 and V-UE 104 may comprise, but are not limited to, an on board unit (OBU), a vehicle or subsystem thereof, or various other communication devices. The V-UEs 102 and 104 function and provide communications on behalf of their associated vehicles and, accordingly, may be sometimes referred to herein simply as vehicles 102 and 104 or UEs 102 and 104. The first UE 102 and second UE 104, for example, may be two vehicles traveling on a road along with other vehicles, not illustrated.

The wireless communication system 100 may use, e.g., Vehicle-to-Everything (V2X) communication standard, in which information is passed between a vehicle and other entities within the wireless communication network. The V2X services include, e.g., services for Vehicle-to-Vehicle (V2V), Vehicle-to-Pedestrian (V2P), Vehicle-to-Infrastructure (V2I), and Vehicle-to-Network (V2N). The V2X standard aims to develop autonomous or semi-autonomous driving systems, such as Advanced Driver Assistance System (ADAS), which helps drivers with critical decisions, such as lane changes, speed changes, overtaking speeds, and may be used to assist in parking as discussed herein. Low latency communications are used in V2X and are therefore suitable for precise relative positioning, e.g., using ranging signals, such as one way ranging, RTT, TDOA, etc.

In general, there are two modes of operation for V2X services, as defined in Third Generation Partnership Project (3GPP) TS 23.285. One mode of operation uses direct wireless communications between V2X entities when the V2X entities, which may sometimes be referred to as sidelink communication. The other mode of operation uses network based wireless communication between entities. The two modes of operation may be combined, or other modes of operation may be used if desired.

The wireless communication system 100 may operate using direct or indirect wireless communications between the UE 102 and UE 104. For example, the wireless communication may be over, e.g., Proximity-based Services (ProSe) Direction Communication (PC5) reference point as defined in 3GPP TS 23.303, and may use wireless communications under IEEE 1609, Wireless Access in Vehicular Environments (WAVE), Intelligent Transport Systems (ITS), and IEEE 802.11p, on the ITS band of 5.9 GHz, or other wireless connections directly between entities. Thus, as illustrated, UE 102 and UE 104 may directly communicate using with a Vehicle-to-Vehicle (V2V) communication link 103. UE 102 and UE 104 may similarly directly communicate with roadside unit (RSU) 110 via Vehicle-to-Infrastructure (V2I) communication links 107 and 109, respectively. The RSU 110, for example, may be a stationary infrastructure entity, that may support V2X applications and that can exchange messages with other entities supporting V2X applications. An RSU may be a logical entity that may combine V2X application logic with the functionality of base stations in a RAN, such as an eNB, ng-eNB, or eLTE (referred to as eNB-type RSU) or a gNB, or UE (referred to as UE-type RSU). The RSU 110 may include a backhaul connection to a network, illustrated by wired connection 111, but may via a wireless Uu interface to a base station. The RSU 110 may be used for ranging with UEs 102, 104, or other UEs, and because the position of the RSU 110 may be known precisely, the RSU 110 may be used as an anchor UE with which a position of the UE 102, 104 or other UEs may be determined. The RSU 110 may sometimes be referred to herein as UE 110. The UEs 102, 104 and UE 110 may communicate with additional entities, such as additional vehicles, RSUs or with a UE 112 held by pedestrian 114 using direct communication links. For example, UE 102 may communicate with UE 112 via V2V communication link 113, UE 104 may communicate with UE 112 via V2V communication link 115, and UE 110 may communicate with UE 112 via V2I communication link 117.

During direct communications with one or more entities in the V2X wireless communication system 100, each entity may provide V2X information, such as an identifier for the V2X entity, as well as other information in messages such as Common Awareness Messages (CAM) and Decentralized Notification Messages (DENM) or Basic Safety Message (BSM), which may be used for, e.g., ADAS or safety use cases.

In other implementations, UE 102 and UE 104 may indirectly communicate with each other, e.g., through the RSU 110 via the V2I communication links 107 and 109, respectively or through other network infrastructure (not shown), e.g., e.g., using cellular vehicle-to-everything (CV2X). For example, vehicles may communicate via a base station in a Radio Access Network (RAN), such as an evolved Node B (eNB) or next generation evolved Node B (ng-eNB) in LTE wireless access and/or evolved LTE (eLTE) wireless access or a NR Node B (gNB) in Fifth Generation (5G) wireless access.

UEs 102 and 104 may initiate and perform ranging/positioning sessions, including sending pre-PRS messages, broadcasting PRS, and sending post-PRS messages on links 103, 107, 109, 113 or 115, with which the range or relative positions between UEs 102 and 104 may be determined. The PRS broadcast by UEs 102 and 104 may be any signal suitable for ranging, e.g., as defined for DSRC or C-V2X. The PRS may be broadcast on licensed or unlicensed spectrum. For example, in some implementations, PRS may be broadcast on one or more Unlicensed National Information Infrastructure (UNII) radio bands including, for example, one or more of the UNII-1 radio band, the UNII-2A radio band, the UNII-2B radio band, or the UNII-3 radio band. When broadcasting on unlicensed spectrum, listen-before-transmit (LBT) protocols may be employed.

Where UEs 102 and 104 broadcast PRS in a V2V link 103, the range or relative positions between UEs 102 and 104 may be determined directly. Where UE 102 and 104 broadcast PRS in V2I links 107 and 109 or via links 113 and 115, the range or relative positions between UE 102 and UE 110 or UE 112 and between UE 104 and UE 110 or UE 112 may be determined directly.

The direct wireless communications between the UE 102 and 104 and UE 110 and UE 112, do not require any network infrastructure and enable low latency communications, which is advantageous for precise ranging or positioning. Accordingly, such direct wireless communications may be desirable for ranging over short distances, e.g., with nearby vehicles or infrastructure.

The UEs, e.g., any of V-UE 102, V-UE 104, RSU 110, and UE 112, shown in FIG. 1, may be configured to perform ranging and/or positioning operations, such as RTT-based ranging. During RTT-based ranging, a number of messages are sent between an initiating UE and a receiving UE, including pre-PRS messages to request and accept a ranging session, the PRS signals for measurement, and post-PRS messages to exchange measurement payloads. The initiating UE transmits a pre-PRS message to request a ranging session with other UEs. The pre-PRS message may indicate ranging signal properties to be used in the ranging session, such as PRS resources, including frequency and timing instances, and PRS identifier (ID). The receiving UE's respond to the pre-PRS message from the initiating UE, e.g., indicating that the receiving UE accepts the request for the ranging session. The pre-PRS messages may be transmitted on a licensed spectrum to guarantee reliability.

The initiating UE broadcasts the PRS signal and in response the receiving UE broadcasts its own PRS signal. Each UE records the time of departure (ToD) of its broadcast PRS signal and measure the time of arrival (ToA) of the PRS signal received from the other UE. In some implementations, the angle of departure (AoD) and angle of arrival (AoA) of the broadcast and received PRS signals may also be measured. The PRS signal may be any signal suitable for ranging, e.g., as defined for DSRC or C-V2X. The PRS signal, for example, is a pseudo-noise (PN) sequence. The ToA and ToD resolution of the PRS signals increase with an increased frequency bandwidth. The PRS signal may be broadcast on an unlicensed spectrum in order to use a wide frequency band. For example, in some implementations, PRS may be broadcast on one or more UNII radio bands including, for example, one or more of the UNII-1 radio band, the UNII-2A radio band, the UNII-2B radio band, or the UNII-3 radio band. When broadcasting PRS signals on an unlicensed spectrum, LBT constraints may be employed.

The initiating UE and the receiving UE exchange post-PRS messages, each indicating the ToD (and AoD if measured) of its broadcast PRS and the measured ToA (and angle of arrival (AoA) if measured) for the received PRS signal. The post-PRS messages may be transmitted on a licensed spectrum to guarantee reliability.

Both the initiating UE and the receiving UE may determine the range between the initiating UE and the receiving UE based on the ToD and the ToA of the broadcast PRS signals. For example, based on the $ToD_i$ and $ToA_i$ for the $PRS_i$ signals (where i=1 for PRS broadcast by the initiating UE and i=2 for PRS broadcast by the receiving UE), the RTT between the initiating UE and receiving UE may be determined as the difference between the $ToD_1$ and $ToA_2$ minus the difference between the $ToA_1$ and the $ToD_2$. The RTT value is the round trip time for the signal, and thus, the range (distance) between the initiating UE and receiving UE may be determined as RTT/2c, where c is the speed of light.

If the position of one or more UEs is known, the range between the initiating UE and receiving UE may be used, along with a known position of one of the UE's to determine the position of the other UE, and thus, the ranging session may be a positioning session. The positions of UEs may be provided to other UEs through messaging, e.g., in the pre-PRS messages or in the post-PRS messages. If the positions of multiple UE's are known, multilateration may be used to determine the position of remaining UEs. The angle measurements may be used, e.g., for assistance in positioning. By way of example, based on the range between two UEs and a measured AoA, the relative positions of the two UEs may be determined. With the relative positions of the UEs determined, if the actual position of one of the UEs is known (which may be provided, e.g., in the pre-PRS or post-PRS messages), actual position of the other UE may be determined. For example, if the position of two UEs are known by a third UE, the ranges between the third UE and each of the other two UEs will produce two possible positions for the third UE, which may be resolved based on AoD/AoA information. The AoD may be useful if the resolution of the AoA is poor or incorrect, for example. AoD may be measured, e.g., based on a known orientation of the UE (for example, determined by a magnetometer), and the direction of the transmitted signal relative to the UE (e.g., relative to an antenna array of the UE used for beamforming). The AoA may be measured based on the phase difference of a received signal at different antenna elements of an antenna array and the known orientation of the UE, for example determined by a magnetometer). Additionally, geographic constraints may be used to assist in positioning, for example, by constraining possible positions of a vehicle based UE to positions accessible to a vehicle, such as a road.

Figure 2:
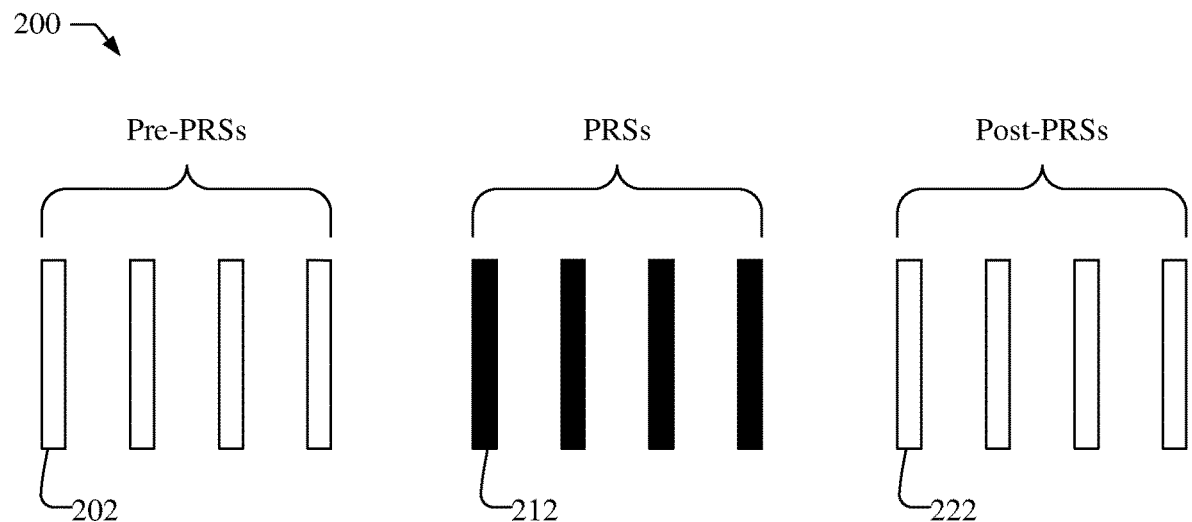
FIGS. 2 and 3 illustrates ranging sessions that include four UEs using different types of Listen Before Transmit (LBT) types.
Figure 3:
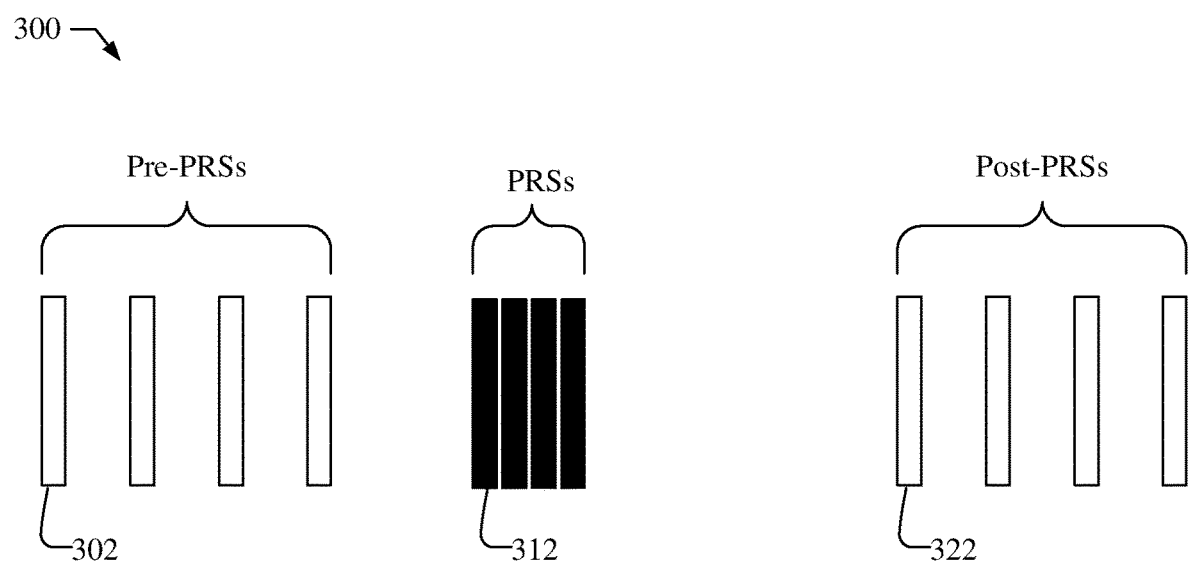

FIGS. 2 and 3 illustrates ranging sessions 200 and 300 that involve four UEs, in which pre-PRS signals, PRS signals, and post-PRS signals are exchanged. In both ranging sessions 200/300, the first pre-PRS signal 202/302, first PRS signal 212/312, and first post-PRS signal 222/322 are sent by an initiating UE, while the remaining pre-PRS signals, PRS signals, and post-PRS signals are sent by the receiving UEs.

Ranging sessions 200 and 300 illustrate, for example, different types of LBT that may be employed during broadcast of the PRS signals. Ranging session 200 illustrates, e.g., Category 4 LBT, while ranging session 300 illustrates, e.g., Category 2 LBT. With Category 2 LBT the duration of time that the channel is sensed to be idle before the transmitting UE transmits is deterministic. In contrast, Category 4 LBT uses random backoff with a contention window of variable size, in which the transmitting UE draws a random number N within a contention window. The minimum and maximum value of N specifies the size of the contention window. The random number N is used in the LBT procedure to determine the duration of time that the channel is sensed to be idle before the transmitting UE transmits on the channel. Category 4 LBT generally takes longer time than Category 2 LBT, as illustrated by the inter-PRS signal spacing in ranging sessions 200 and 300, respectively. In one implementation, the initiating UE may receive the time slots for the other UEs so that the other may perform Category 2 LBT.

In a distributed system, two UEs may separately initiate independent ranging sessions at nearly the same time and location. For example, two initiating UEs may each send separate pre-PRS messages to the same receiving UE initiate ranging sessions. If the ranging sessions are close in time, accepting both ranging sessions by the receiving UE may result in interference. For example, the PRS signals in the separate ranging sessions may have overlapping frequencies, and thus, the ranging sessions may interfere in frequency. Moreover, the PRS signals may be transmitted using unlicensed spectrum and LBT procedures may be used. If the PRS signals for the ranging sessions are transmitted at nearly the same time, PRS transmissions of one ranging session may interfere with LBT procedures in the other ranging session, which may increase latency and decrease accuracy of the ranging measurements.

To reduce the chance of interference between multiple ranging sessions, a receiving UE that receives requests to initiate ranging sessions from multiple UEs, e.g., within a threshold time threshold or distance threshold, may divide the available ranging signal properties for the PRS signals, e.g., the frequency bandwidth, PRS timing instances, and PRS identifiers or a combination thereof, by the number of total initiating UEs. Each initiating UE may be assigned a different portion of the ranging signal properties so that the ranging sessions are disjointly constructed, e.g., the ranging sessions have no PRS properties in common.

Figure 4:
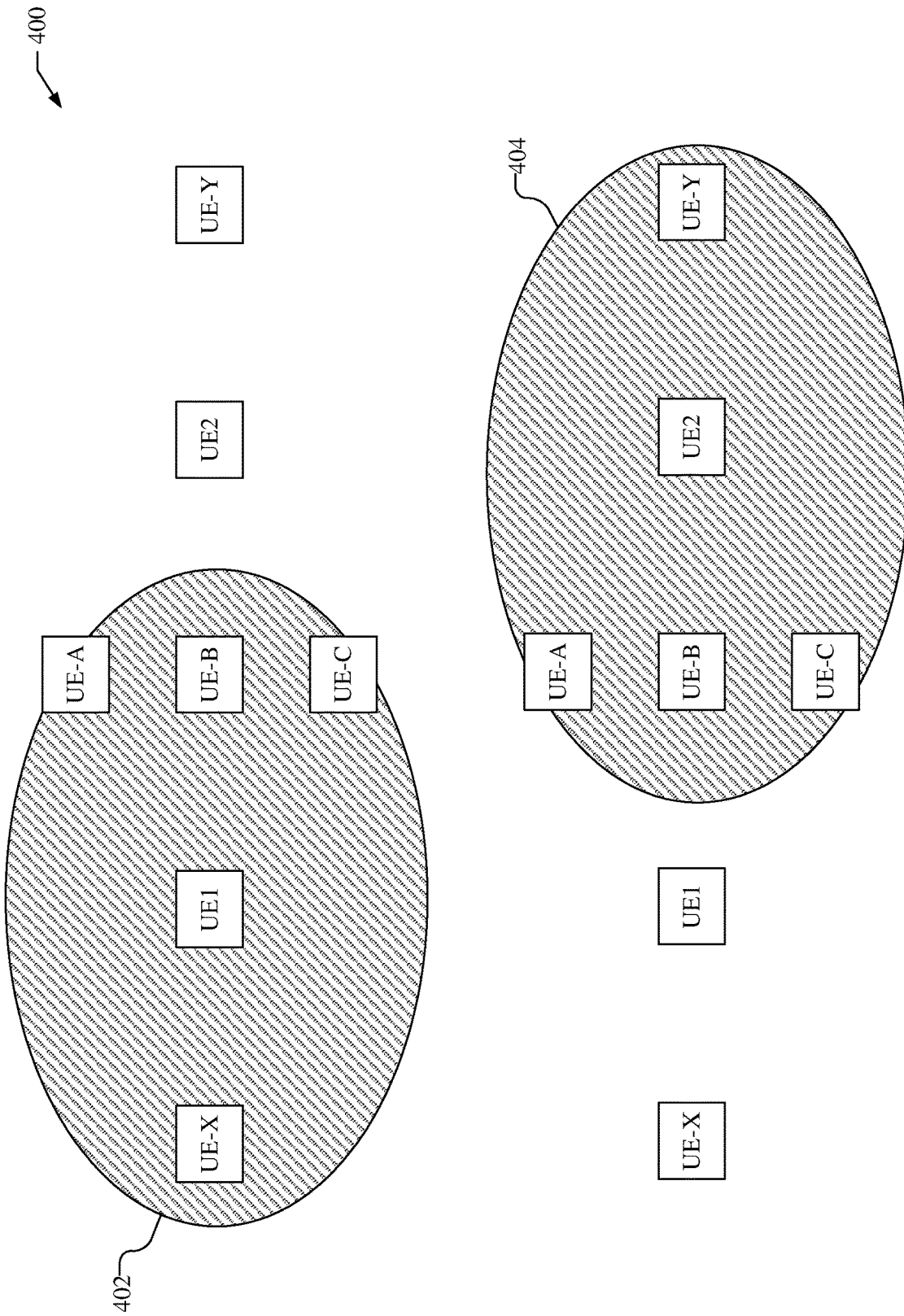
FIG. 4 illustrates a number of UEs engaged in separate ranging sessions that are temporally separated.

FIG. 4 illustrates a number of UEs that are engaged in two ranging sessions 400, e.g., RTT-based ranging, that are timely separated. In FIG. 4, initiating UE1 initiates a first ranging session with nearby receiving UEs, i.e., UE-A, UE-B, UE-C and UE-X, and initiating UE2 initiates a second ranging session with nearby receiving UEs, i.e., UE-A, UE-B, UE-C and UE-Y. Thus, receiving UEs UE-A, UE-B, and UE-C receiving the pre-PRS messages from both initiating UE1 and initiating UE2, while UE-X only receives the pre-PRS message from initiating UE1 and UE-Y only receives the pre-PRS message from initiating UE2.

Upon reception of the pre-PRS messages from both initiating UE1 and initiating UE2, each receiving UE may determine whether the separate ranging sessions may overlap, e.g., by determining whether the pre-PRS messages are received within a time threshold, e.g., less than 1 second from each other. If the pre-PRS messages are not within the time threshold, e.g., the pre-PRS messages are received more than 1 second apart, then the ranging sessions initiated by initiating UE1 and initiating UE2 are considered timely separated and the receiving UE may respond with pre-PRS messages to each initiating UE to accept the ranging session initiated by one UE without considering the other ranging session that was initiated by the other UE. For example, receiving UE-A may respond with a pre-PRS message to initiating UE1 and with a pre-PRS message to initiating UE2 accepting the separate ranging sessions without considering whether the separate ranging sessions may have the same ranging signal properties for the PRS signals.

Accordingly, the first ranging session 402 initiated by UE1 may be accepted by UE-A without considering the ranging signal properties assigned to the second ranging session 404 initiated by UE2, and vice versa, the second ranging session 404 may be accepted by UE-A without considering the ranging signal properties assigned to the first ranging session 402. Consequently, as illustrated by ovals with the same shading in FIG. 4, PRS signals broadcast in the first ranging session 402 by UE1 and the PRS signals broadcast in the second ranging session 404 by UE2 may have the one or more ranging signal properties that are the same but are transmitted at separate times. Because the first ranging session 402 and second ranging session 404 are timely separated, there is little risk of interference.

Each of receiving UEs UE-A, UE-B, and UE-C may separately consider whether the pre-PRS messages received from both initiating UE1 and initiating UE2 are outside a time threshold and may be considered timely separated.

Figure 5:
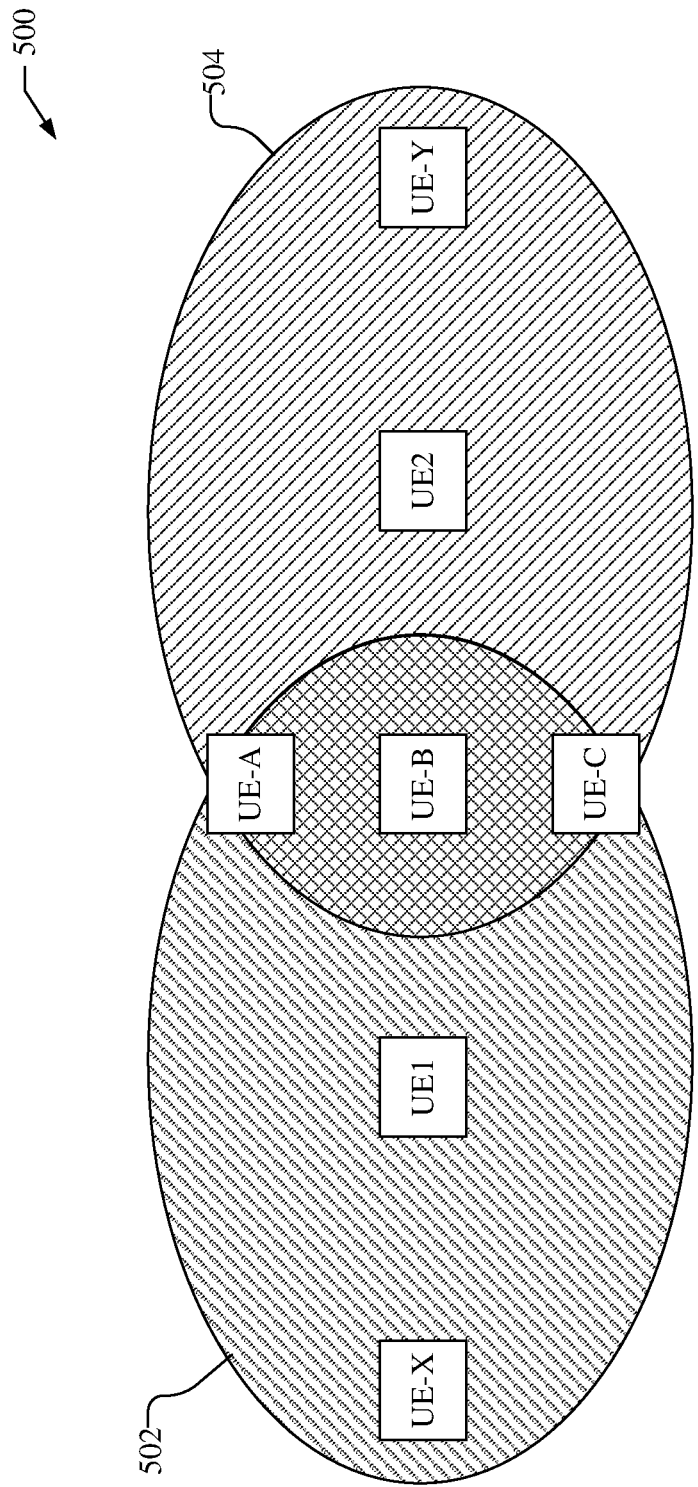
FIG. 5 illustrates a number of UEs engaged in separate ranging sessions that are not temporally separated and using different sets of ranging signal parameters for each ranging session.

FIG. 5 is similar to FIG. 4, like designated elements being the same, but illustrates two ranging sessions 500, e.g., RTT-based ranging, that are not timely separated.

As discussed above, upon reception of the pre-PRS messages from both initiating UE1 and initiating UE2, each receiving UE may determine whether there the separate ranging sessions may overlap, e.g., by determining whether time instances of the pre-PRS messages are received within a time threshold, e.g., less than 1 second from each other. If the pre-PRS messages are within the time threshold, e.g., the pre-PRS messages are received within 1 of each other, then the ranging sessions initiated by initiating UE1 and initiating UE2 are considered not timely separated. Accordingly, the receiving UE may respond with pre-PRS messages to each initiating UE to accept the ranging sessions, but the receiving UE considers the ranging signal properties for the PRS signals in the other ranging sessions. For example, the receiving UE will determine whether the ranging signal properties for the ranging sessions overlap and will divide the ranging signal properties amongst the ranging sessions. Thus, for example, receiving UE-A may check all the available PRS bandwidth and will divide the available PRS bandwidth by the number of total initiating UEs. As an example, if the available PRS bandwidth is 80 MHz, the receiving UE-A will divide the available PRS bandwidth by the number of initiating UEs, in this case 2, resulting in 40 MHz. The receiving UE-A will additionally ensure that PRS timing instances and PRS IDs are not shared by the two ranging sessions. The receiving UE-A may respond to the pre-PRS message to initiating UE1 providing a set of the ranging signal properties that are assigned to the initiating UE1 and may respond to the pre-PRS message to initiating UE2 providing a different set of ranging signal properties that are assigned to the initiating UE2.

Accordingly, as illustrated in FIG. 5, the first ranging session 502 initiated by UE1 and the second ranging session 504 initiated by UE2 may both be accepted by UE-A, but with different sets of ranging signal properties, as illustrated by the ovals with different shading in FIG. 5. Thus, the PRS signals in the first ranging session 502 and the PRS signals in the second ranging session 504 may be broadcast by UE1 and UE2, respectively, with different ranging signal properties at approximately the same time. Because the PRS signals in first ranging session 502 and second ranging session 504 have different ranging signal properties, there is little risk of interference even though they are not timely separated.

In one implementation, the receiving UEs may additionally determine whether the separate ranging sessions initiated by UE 1 and UE2 overlap based on distance, e.g., whether the initiating UE1 and initiating UE2 are geometrically separated. Geometric separation of the initiating UEs is relevant because when the UEs are close together, LBT efficiency is impacted. For example, a receiving UE may be included in two ranging sessions with little geometric separation, where the initiating UEs initiate the LBT of their own session at the same time. In the overlapped area, the receiving UE will need to perform LBT for both PRS transmissions, which is inefficient. Accordingly, receiving UE may consider both whether the initiating UEs are geometrically separated and whether the pre-PRS messages received from the initiating UEs are timely separated. In some implementations, the receiving UE may treat geometric separation and time separation as a logical OR function or as a logic AND function. For example, in some implementations, if either geometric separation or time separation is not present, the receiving UE may accept the ranging sessions by assigning each ranging session a different set of ranging signal properties for the PRS signals. In another implementation, the receiving UE may accept the ranging sessions by assigning each ranging session a different set of ranging signal properties for the PRS signals only if there is neither geometric separation nor time separation.

The receiving UE may be aware of the position of the initiating UEs, UE1 and UE2, if the initiating UEs provide their positions to the receiving UEs in the pre-PRS messages, e.g., if V2V ranging is enabled. In this instance, for example, the receiving UE may consider both whether initiating UEs are within a distance threshold from each other, e.g., |UE1 location−UE2 location|<threshold (e.g., 20 meters). If the initiating UEs are not within the distance threshold from each other, e.g., the initiating UEs are more than 20 meters apart, the initiating UEs may be considered geometrically separated. Accordingly, the receiving UE may respond with pre-PRS messages to each initiating UE to accept the ranging session initiated by one UE without considering the other ranging session that was initiated by the other UE, e.g., as described in reference to FIG. 4. In some implementations, time separation may also be considered by the receiving UE and the ranging sessions may be accepted by the receiving UE without considering the other ranging session if there is also time separation.

On the other hand, if the initiating UEs are within the distance threshold from each other, e.g., the initiating UEs are less than 20 meters apart, the initiating UEs may be considered not geometrically separated. Accordingly, the receiving UE may respond with pre-PRS messages to each initiating UE to accept the ranging sessions, but the receiving UE considers the ranging signal properties for the PRS signals in the other ranging sessions. For example, as discussed in reference to FIG. 5, the receiving UE will determine whether the ranging signal properties for the ranging sessions overlap and will divide the ranging signal properties amongst the ranging sessions. The receiving UE may accept the ranging sessions from UE1 and UE2, but with different sets of ranging signal properties. In some implementations, time separation may also be considered by the receiving UE. For example, the ranging sessions may be accepted by the receiving UE with different sets of ranging signal properties if there is also no time separation.

Each of receiving UEs UE-A, UE-B, and UE-C may separately consider whether initiating UE1 and initiating UE2 are outside a distance threshold from each other and may be considered geometrically separated and/or whether the pre-PRS messages received from both initiating UE1 and initiating UE2 are outside a time threshold and may be considered timely separated.

Figure 6:
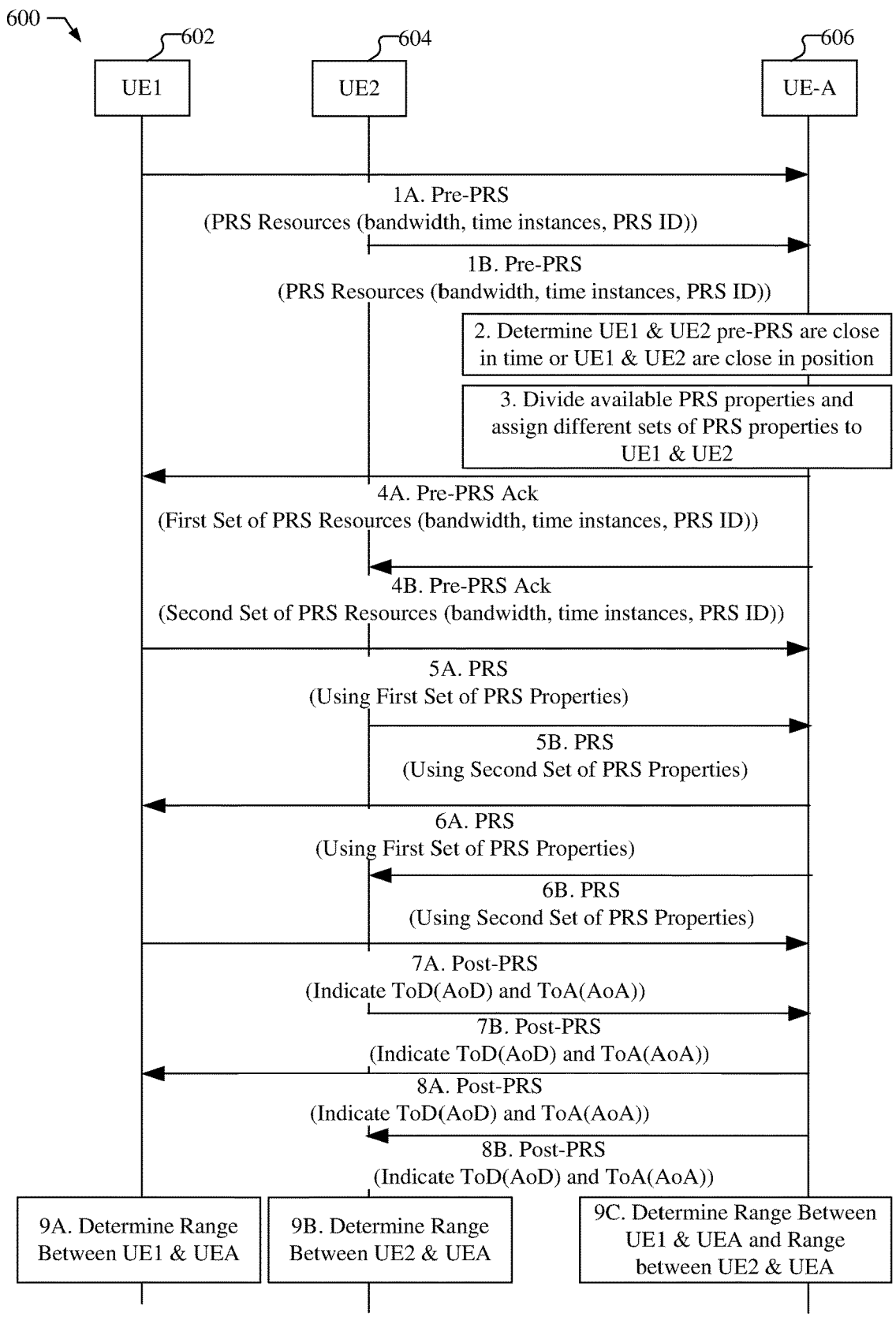
FIG. 6 illustrates an example of a signaling flow for multiple ranging procedures in which different sets of ranging signal parameters are used for the ranging sessions.

FIG. 6 illustrates an example of a signaling flow 600 for multiple ranging procedures between initiating UE1 602 and receiving UE-A 606 and initiating UE2 604 and receiving UE-A 606, in which different sets of ranging signal parameters are used for the ranging sessions, as discussed herein. The initiating UEs 602, 604 and receiving UE 606 may be the UE1, UE2, and UE-A, respectively, as shown in FIG. 5, and may be similar to one or more of the vehicle based UEs (V-UE) 102 and 104, RSU 110 or UE 112, as described in FIG. 1. It should be understood that FIG. 6 illustrates the signaling for multiple ranging procedures involving only one receiving UE, e.g., UE-A 606, and that additional receiving UEs may be present, which would involve additional communications that are similar to that shown in FIG. 6. As illustrated, the communications between the UEs 602, 604, and 606 in FIG. 6 may be direct communications between the entities and may not involve infrastructure devices, such as base stations, to forward the messages between the entities.

At stage 1A, the first initiating UE1 602 sends a pre-PRS message to request a ranging session with receiving UE-A 606. The pre-PRS message may be transmitted via a licensed spectrum. The pre-PRS message may indicate ranging signal properties to be used in the ranging session with initiating UE1 602, such as PRS resources, including frequency and timing instances, and PRS identifier (ID). In some implementations, the pre-PRS message may further include a current position of the initiating UE1 602.

At stage 1B, the second initiating UE2 604 also sends a pre-PRS message to request a ranging session with the receiving UE-A 606. Similar to stage 1A, the pre-PRS message sent in stage 1B may be transmitted via a licensed spectrum and may indicate ranging signal properties to be used in the ranging session with initiating UE2 604, such as PRS resources, including frequency and timing instances, and PRS identifier (ID). In some implementations, the pre-PRS message may further include a current position of the initiating UE2 604.

At stage 2, the receiving UE-A 606 determines if the ranging sessions initiated by UE1 602 and UE2 604 are timely separated and/or geographically separated. For example, the receiving UE-A 606 may determine whether the pre-PRS messages received in stages 1A and 1B are received within a time threshold, e.g., $|T_{1A}-T_{1B}|<\text{Threshold}_T$, where $T_{1A}$ is the time of reception of the pre-PRS message from stage 1A, $T_{1B}$ is the time of reception of the pre-PRS message from stage 1B, and $\text{Threshold}_T$ is predetermined time threshold, which may be 1 second or any other desired value. If position information is provided in the pre-PRS messages from stage 1A and 1B, the receiving UE-A 606 may additionally determine whether the initiating UEs (UE1 602 and UE2 604) are within a distance threshold, e.g., $|\text{UE1 location}-\text{UE2 location}|<\text{Threshold}_D$, where UE1 location is the position of initiating UE1 602, UE2 location is the position of initiating UE2 604, and $\text{Threshold}_D$ is a predetermined distance threshold, which may be 20 meters or any other desired value. In some implementations, if the ranging session is determined to not have sufficient time separation, the receiving UE-A 606 may determine whether there is sufficient temporal separation, which may use a different time threshold than $\text{Threshold}_T$.

At stage 3, if the ranging sessions are not considered to be timely separated and/or geographically separated sufficiently, as determined in stage 2, the receiving UE-A 606 may divide the available PRS resources based on the number of initiating UEs and assign different sets of PRS properties for the ranging sessions with each of the initiating UEs (UE1 602 and UE2 604). The division of the PRS resources, for example, may include dividing the frequency bandwidth between the initiating UEs, and ensuring that the PRS timing instances and PRS ID are different for the initiating UEs. For example, if, in stage 2, the receiving UE-A 606 determines there is not sufficient time separation, then stage 3 may be performed and the available PRS properties may be divided. If, in stage 2, the receiving UE-A 606 determines there is not sufficient geometric separation, then stage 3 may be performed and the available PRS properties may be divided, unless there is a large time separation between the ranging sessions. If, in stage 2, the receiving UE-A 606 determines there is sufficient time separation and/or geographic separation, stage 3 need not be performed and the ranging sessions for both initiating UEs (UE1 602 and UE2 604) may use the full available PRS resources. The following stages assume that stage 3 is performed.

At stage 4A, the receiving UE-A 606 sends a pre-PRS message, e.g., a pre-PRS acknowledgement, indicating that the receiving UE-A 606 accepts the request for the ranging session from initiating UE1 602, and providing a first set of PRS resources assigned to initiating UE1 602 in stage 3, e.g., frequency bandwidth, timing instances and PRS ID. The pre-PRS message of stage 4A may be transmitted on a licensed spectrum. In some implementations, the pre-PRS message may further include a current position of the receiving UE-A 606.

At stage 4B, the receiving UE-A 606 sends a pre-PRS message, e.g., a pre-PRS acknowledgement, indicating that the receiving UE-A 606 accepts the request for the ranging session from initiating UE2 604, and providing a second set of PRS resources assigned to initiating UE2 604 in stage 3, e.g., frequency bandwidth, timing instances and PRS ID. The second set of PRS resources provided in stage 4B to initiating UE2 604 is different than the first set of PRS resources provided in stage 4A to initiating UE1 602. The pre-PRS message of stage 4B may be transmitted on a licensed spectrum. In some implementations, the pre-PRS message may further include a current position of the receiving UE-A 606.

At stage 5A, the initiating UE1 602 broadcasts a PRS signal using the first set of PRS resources. The PRS signal may be broadcast on an unlicensed spectrum in order to use a wide frequency band. The initiating UE1 602 records the ToD of the PRS signal and in some implementations the AoD of the PRS signal and the receiving UE-A 606 records the ToA of the PRS signal and in some implementations the AoA of the PRS signal.

At stage 5B, the initiating UE2 604 broadcasts a PRS signal using the second set of PRS resources. The PRS signal may be broadcast on an unlicensed spectrum in order to use a wide frequency band. The initiating UE2 604 records the ToD of the PRS signal and in some implementations the AoD of the PRS signal and the receiving UE-A 606 records the ToA of the PRS signal and in some implementations the AoA of the PRS signal. Because the PRS signals broadcast in stages 5A and 5B use different sets of PRS resources, there is little chance of interference.

At stage 6A, in response to receiving the PRS signal in stage 5A, the receiving UE-A 606 broadcasts a PRS signal using the first set of PRS resources. The PRS signal may be broadcast on an unlicensed spectrum in order to use a wide frequency band. The receiving UE-A 606 records the ToD of the PRS signal and in some implementations the AoD of the PRS signal and the initiating UE1 602 records the ToA of the PRS signal and in some implementations the AoA of the PRS signal.

At stage 6B, in response to receiving the PRS signal in stage 5B, the receiving UE-A 106 broadcasts a PRS signal using the second set of PRS resources. The PRS signal may be broadcast on an unlicensed spectrum in order to use a wide frequency band. The receiving UE-A 606 records the ToD of the PRS signal and in some implementations the AoD of the PRS signal and the initiating UE2 604 records the ToA of the PRS signal and in some implementations the AoA of the PRS signal.

At stage 7A, the initiating UE1 602 sends a post-PRS message to the receiving UE-A 606 indicating the ToD, and in some implementations the AoD, of the PRS signal broadcast at stage 5A and indicating the ToA, and in some implementations the AoA, of the PRS signal received at stage 6A.

At stage 7B, the initiating UE2 604 sends a post-PRS message to the receiving UE-A 606 indicating the ToD, and in some implementations the AoD, of the PRS signal broadcast at stage 5B and indicating the ToA, and in some implementations the AoA, of the PRS signal received at stage 6B.

At stage 8A, the receiving UE-A 606 sends a post-PRS message to the initiating UE1 602 indicating the ToA, and in some implementations the AoA, of the PRS signal received at stage 5A and indicating the ToD, and in some implementations the AoD, of the PRS signal broadcast at stage 6A.

At stage 8B, the receiving UE-A 606 sends a post-PRS message to the initiating UE2 604 indicating the ToA, and in some implementations the AoA, of the PRS signal received at stage 5B and indicating the ToD, and in some implementations the AoD, of the PRS signal broadcast at stage 6B.

At stage 9A, the initiating UE1 602 may determine the range between UE1 602 and receiving UE-A 606 based on the ToD and ToA of the PRS signals broadcast in stages 5A and 6A. For example, the range may be determined based on the ToD$_i$ and ToA$_i$ for the PRS$_i$ signals (where i=1 for PRS broadcast by the initiating UE1 602 and i=2 for PRS broadcast by the receiving UE-A 606) as:

$$\text{Range} = \frac{(ToD_1 - ToA_2) - (ToA_1 - ToD_2)}{2c}. \quad \text{eq. 1}$$

If the position of the receiving UE-A 606 is known, e.g., provided in pre-PRS message in stage 4A, along with additional information, such as AoA or AoD of the PRS signals or positions and ranges for other receiving UEs (not shown in FIG. 6), or geographic information, such as street locations, the position of the initiating UE1 602 may be determined using, e.g., multilateration and constraints pursuant to the AoA or AoD of the PRS signals and geographic information.

At stage 9B, the initiating UE2 604 may determine the range between UE2 604 and receiving UE-A 606 based on the ToD and ToA of the PRS signals broadcast in stages 5B and 6B, in a manner similar to that described in stage 9A. The position of the initiating UE2 604 may also be determined in a manner similar to that described in stage 9A.

At stage 9C, the receiving UE-A 606 may determine the range between UE-A 606 and initiating UE1 602 and the range between UE-A 606 and initiating UE2 604, based on the ToA and ToD of the PRS signals broadcast in stages 5A and 6A and broadcast in stages 5B and 6B, respectively, in a manner similar to that described in stages 9A and 9B. The position of the receiving UE-A 606 may also be determined in a manner similar to that described in stage 9A, e.g., based on positions of initiating UE1 602 and UE2 604 if provided at stages 1A and 1B.

Figure 7:
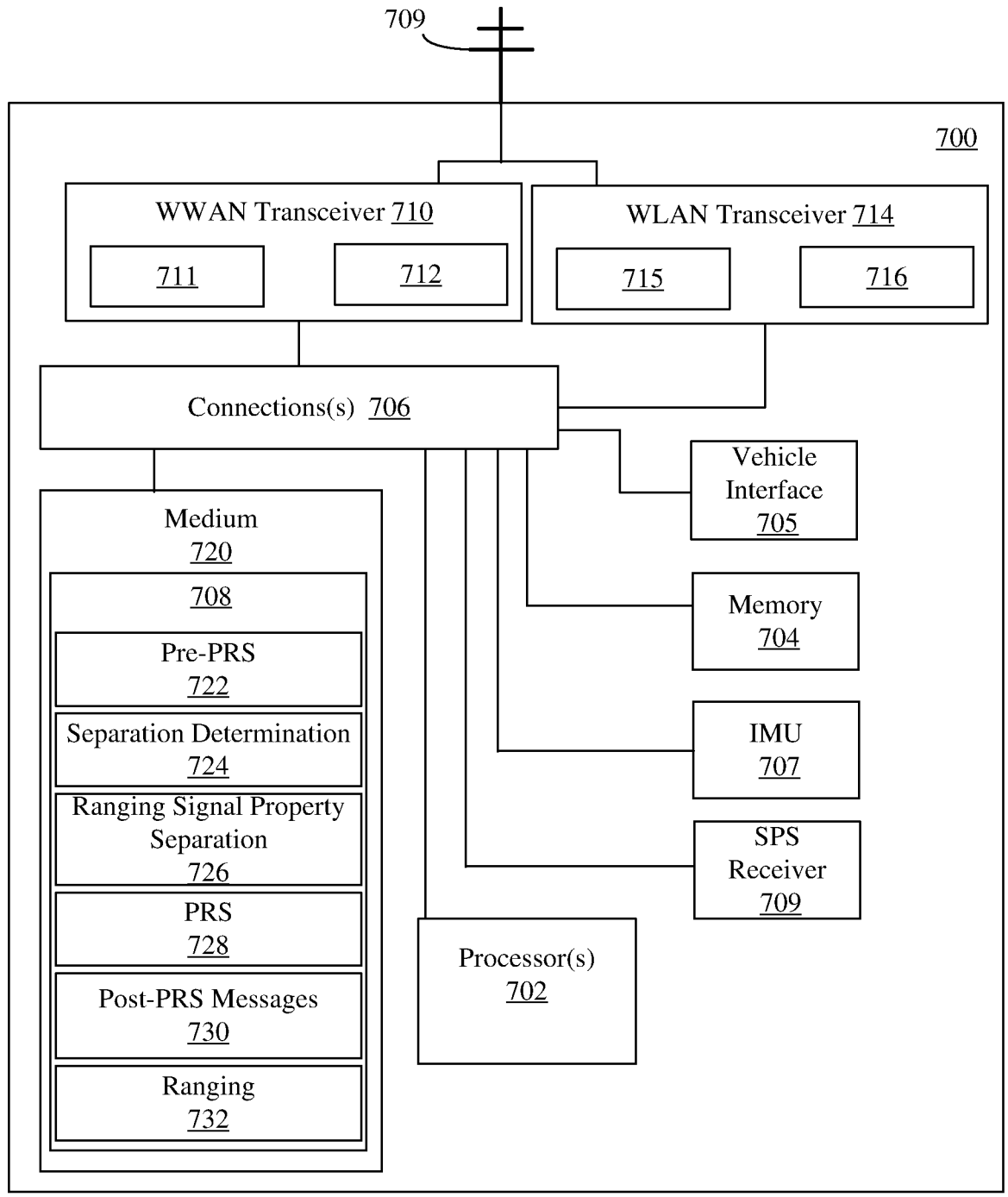
FIG. 7 shows a schematic block diagram illustrating certain exemplary features of a UE configured for multiple ranging sessions in which different sets of ranging signal parameters are used.

FIG. 7 shows a schematic block diagram illustrating certain exemplary features of a user equipment (UE) 700, which may be UE in one or vehicles 102 or 104, an RSU 110, or UE 112 held by a pedestrian 114, as illustrated in FIG. 1, or any UE illustrated in FIG. 2 or 4-6. The UE 700 may be configured to act as a receiving UE, e.g., receiving UE-A, or an initiating UE, e.g., initiating UE1, where multiple ranging sessions that are not separated in time or geographically and in which different sets of ranging signal parameters are used for the ranging sessions, as discussed herein. If the UE 700 is a V-UE, it may be configured to control the automated driving of a vehicle, e.g., vehicle 102. For example, the UE 700 may include a vehicle interface 705 with which commands are provided to the vehicle for automated driving and sensory input, including speed and acceleration, may be provided from the vehicle to UE 700. The UE 700 may, for example, include one or more processors 702, memory 704, an inertial measurement unit (IMU) 707 that may include, e.g., an accelerometer, gyroscope, magnetometers, etc., which may be used to detect orientation with respect to a global or local reference frame and the motion or one or more motion characteristics of the vehicle, a satellite positioning system (SPS) receiver 709 to determine, e.g., a GPS position, and an external interface including, e.g., a Wireless Wide Area Network (WWAN) transceiver 710, and a Wireless Local Area Network (WLAN) transceiver 714, which may be operatively coupled with one or more connections 706 (e.g., buses, lines, fibers, links, etc.) to non-transitory computer readable medium 720 and memory 704. The UE 700 may further include additional items, which are not shown, such as a user interface that may include e.g., a display, a keypad or other input device, such as virtual keypad on the display, through which a user may interface with the user device. In certain example implementations, all or part of UE 700 may take the form of a chipset, and/or the like.

Transceiver 710 may be, e.g., a cellular transceiver, that is configured to transmit and receive direct communications in the wireless network, as illustrated in FIG. 1. The transceiver 710 may include a transmitter 711 enabled to transmit one or more signals over one or more types of wireless communication networks and a receiver 712 to receive one or more signals transmitted over the one or more types of wireless communication networks. Transceiver 714 may be, e.g., a short range transceiver, and may be configured to transmit and receive direct communications in the wireless network, as illustrated in FIG. 1. The transceiver 714 may include a transmitter 715 enabled to transmit one or more signals, including PRS signals and pre-PRS and post-PRS messages, over one or more types of wireless communication networks and a receiver 716 to receive one or more signals, e.g., including PRS and pre-PRS and post-PRS messages, transmitted over the one or more types of wireless communication networks. The transceivers 710 and 714 enable the UE 700 to communicate with transportation entities using D2D communication links, such as DSRC, C-V2X, or 5G NR.

In some embodiments, UE 700 may include antenna 709, which may be internal or external. The antenna 709 may be used to transmit and/or receive signals processed by transceiver 710 and/or transceiver 714. In some embodiments, antenna 709 may be coupled to transceiver 710 and/or transceiver 714. In some embodiments, measurements of signals received (transmitted) by UE 700 may be performed at the point of connection of the antenna 709 and transceiver 710 and/or transceiver 714. For example, the measurement point of reference for received (transmitted) RF signal measurements may be an input (output) terminal of the receivers 712, 716 (transmitters 711, 715) and an output (input) terminal of the antenna 709. In a UE 700 with multiple antennas 709 or antenna arrays, the antenna connector may be viewed as a virtual point representing the aggregate output (input) of multiple antennas. The phase difference of received signals at multiple antennas or antenna array may be used to determine the AoA of the signal with respect to the antenna array, which may be converted to a local or global reference frame based on a known orientation of the UE 700, e.g., based on the orientation of the UE 700 to the global or local reference frame as measured by the IMU 707.

The one or more processors 702 may be implemented using a combination of hardware, firmware, and software. For example, the one or more processors 702 may be configured to perform the functions discussed herein by implementing one or more instructions or program code 708 on a non-transitory computer readable medium, such as medium 720 and/or memory 704. In some embodiments, the one or more processors 702 may represent one or more circuits configurable to perform at least a portion of a data signal computing procedure or process related to the operation of UE 700.

The medium 720 and/or memory 704 may store instructions or program code 708 that contain executable code or software instructions that when executed by the one or more processors 702 cause the one or more processors 702 to operate as a special purpose computer programmed to perform the techniques disclosed herein. As illustrated in UE 700, the medium 720 and/or memory 704 may include one or more components or modules that may be implemented by the one or more processors 702 to perform the methodologies described herein. While the components or modules are illustrated as software in medium 720 that is executable by the one or more processors 702, it should be understood that the components or modules may be stored in memory 704 or may be dedicated hardware either in the one or more processors 702 or off the processors.

A number of software modules and data tables may reside in the medium 720 and/or memory 704 and be utilized by the one or more processors 702 in order to manage both communications and the functionality described herein. It should be appreciated that the organization of the contents of the medium 720 and/or memory 704 as shown in UE 700 is merely exemplary, and as such the functionality of the modules and/or data structures may be combined, separated, and/or be structured in different ways depending upon the implementation of the UE 700.

The medium 720 and/or memory 704 may include a pre-PRS module 722 that when implemented by the one or more processors 702 configures the one or more processors 702 to generate and transmit or receive pre-PRS messages via the transceiver 714, e.g., to initiate a ranging session or to accept a ranging session. The pre-PRS message may include ranging signal properties to be used in a ranging session and may include position information for the UE 700. For example, when initiating a ranging session, the pre-PRS message may include ranging signal properties that are available for a ranging session, and when responding to accept a ranging session, the pre-PRS message may include a set of ranging signal properties that is different ranging signal properties received in an initial pre-PRS message and that is assigned to an initiating UE due to the presence of multiple ranging sessions.

The medium 720 and/or memory 704 may include a separation determination module 724 that when implemented by the one or more processors 702 configures the one or more processors 702 to determine whether there is a temporal and/or geographic separation between the first ranging session and the second ranging session, e.g., by determining if the temporal separation is less than a predetermined time threshold or if the geographic separation is less than a predetermined distance threshold. For example, temporal separation may be determined based on a difference between a first time of reception of a first initial message and a second time of reception of a second initial message and whether the difference is less than the predetermined time threshold. Geographic separation may be determined based on whether a difference between a first location of a first initiating UE and the second location of a second initiating UE is less than a predetermined distance threshold. The first location and second locations, for example, may be included in the initial pre-PRS messages from the first initiating UE and the second initiating UE.

The medium 720 and/or memory 704 may include a ranging signal property separation module 726 that when implemented by the one or more processors 702 configures the one or more processors 702 to separate available ranging signal properties between multiple ranging sessions, e.g., a first set for a first ranging session and a second set for a second ranging session, if the temporal and/or geographic separation for the ranging sessions is below the time or distance thresholds. The ranging signal properties, for example, may include frequency bandwidth, ranging signal timing instances, ranging signal identifiers, or a combination thereof. The processor 702 may be configured to divide the available frequency bandwidth between the initiating UEs, and to ensure that the different ranging sessions are assigned different ranging signal timing instances and ranging signal identifiers.

The medium 720 and/or memory 704 may include a PRS module 728 that when implemented by the one or more processors 702 configures the one or more processors 702 to broadcast to other UEs and receive, via the via the transceiver 714, a ranging signal. The ranging signal, for example, may be a PRS signal as discussed herein. The one or more processors 702, for example, may be configured to measure the ToD of broadcast ranging signals and the ToA of received ranging signals, and may be configured to measure the AoD of broadcast ranging signals and the AoA of received ranging signals.

The medium 720 and/or memory 704 may include a post-PRS module 730 that when implemented by the one or more processors 702 configures the one or more processors 702 to send to other UEs and receive, via the via the transceiver 714, post-PRS messages that may include, e.g., indicating the ToD, and in some implementations the AoD, of the broadcast ranging signals and indicating the ToA, and in some implementations the AoA, of the received ranging signals.

The medium 720 and/or memory 704 may include a ranging module 732 that when implemented by the one or more processors 702 configures the one or more processors 702 to determine a range to another UE based on the ToD and ToA of broadcast and received ranging signals as measured by the UE 700 and received in the post-PRS message. The processor 702 may be further configured to determine a position of the UE 700, e.g., based on one or more ranges to broadcasting UEs and their location information using multilateration or other appropriate techniques discussed herein.

The methodologies described herein may be implemented by various means depending upon the application. For example, these methodologies may be implemented in hardware, firmware, software, or any combination thereof. For a hardware implementation, the one or more processors 702 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. The one or more processors 702 may be a general purpose computer that once programmed to perform particular operations pursuant to instructions from program software as described herein operates as a special purpose computer programmed to perform the techniques disclosed herein.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 720 or memory 704 that is connected to and executed by the one or more processors 702. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 708 on a non-transitory computer readable medium, such as medium 720 and/or memory 704. Examples include computer readable media encoded with a data structure and computer readable media encoded with a computer program 708. For example, the non-transitory computer readable medium including program code 708 stored thereon may include program code 708 to support multiple ranging sessions in which ranging signal properties for the PRS signals are divided amongst the multiple ranging sessions, in a manner consistent with disclosed embodiments. Non-transitory computer readable medium 720 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 708 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 720, instructions and/or data may be provided as signals on transmission media included in a communication apparatus. For example, a communication apparatus may include a transceiver 710 having signals indicative of instructions and data. The instructions and data are configured to cause one or more processors to implement the functions outlined in the claims. That is, the communication apparatus includes transmission media with signals indicative of information to perform disclosed functions.

Memory 704 may represent any data storage mechanism. Memory 704 may include, for example, a primary memory and/or a secondary memory. Primary memory may include, for example, a random access memory, read only memory, etc. While illustrated in this example as being separate from one or more processors 702, it should be understood that all or part of a primary memory may be provided within or otherwise co-located/coupled with the one or more processors 702. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 720. As such, in certain example implementations, the methods and/or apparatuses presented herein may take the form in whole or part of a computer readable medium 720 that may include computer implementable code 708 stored thereon, which if executed by one or more processors 702 may be operatively enabled to perform all or portions of the example operations as described herein. Computer readable medium 720 may be a part of memory 704.

Figure 8:
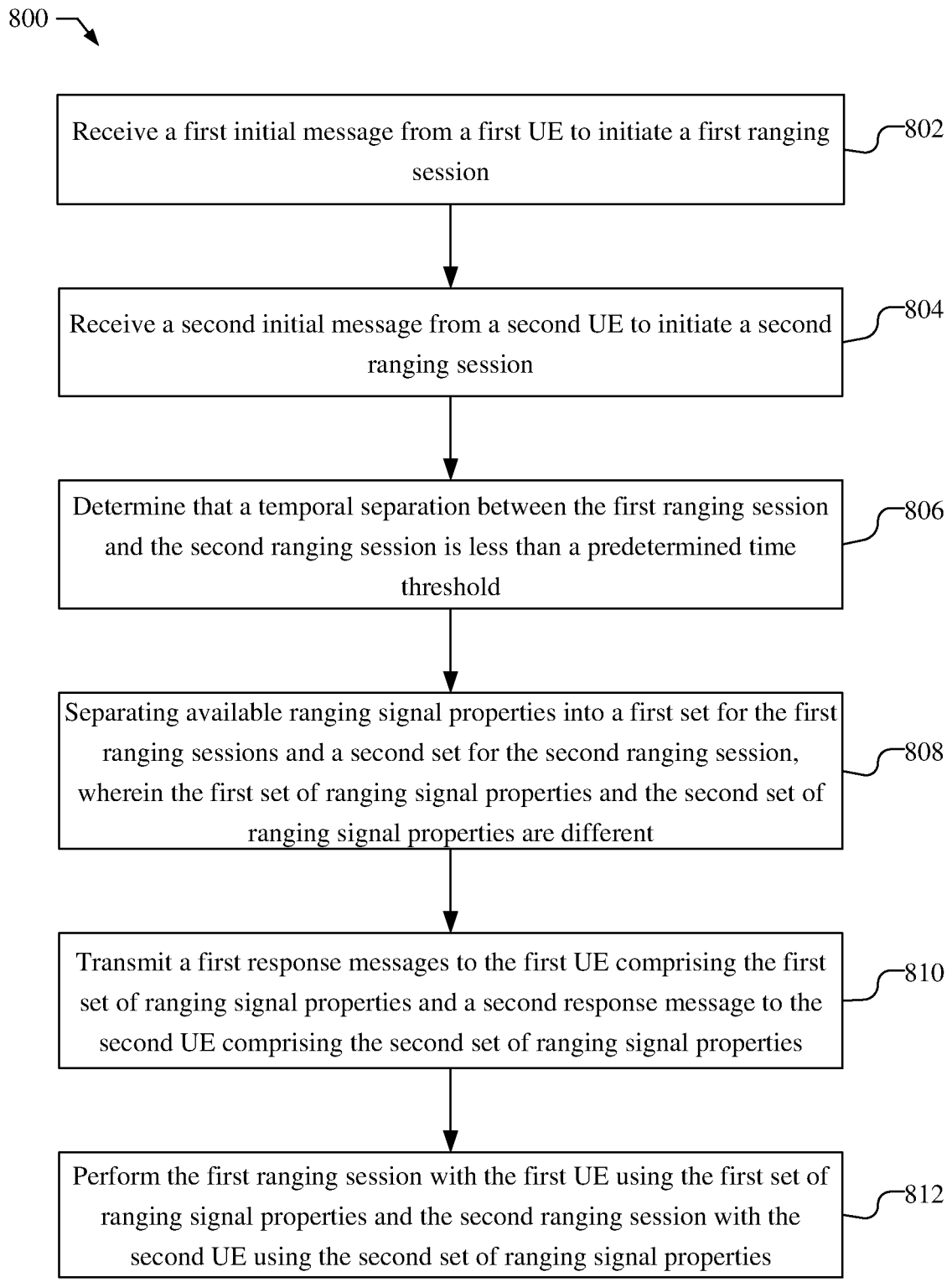
FIG. 8 is a flow chart illustrating a method of ranging between UEs performed by a receiving UE in a ranging session.

FIG. 8 is a flow chart 800 illustrating a method of ranging between user equipments (UEs) performed by a receiving UE in the ranging sessions, such as UE-A 606.

At block 802, a first initial message is received from a first UE to initiate a first ranging session, as discussed at stage 1A of FIG. 6. A means for receiving a first initial message from a first UE to initiate a first ranging session may be, e.g., the transceiver 714 and the one or more processors 702 with dedicated hardware or implementing executable code or software instructions in memory 704 and/or medium 720, such as the pre-PRS module 722.

At block 804, a second initial message is received from a second UE to initiate a second ranging session, as discussed at stage 1B of FIG. 6. A means for receiving a second initial message from a second UE to initiate a second ranging session may be, e.g., the transceiver 714 and the one or more processors 702 with dedicated hardware or implementing executable code or software instructions in memory 704 and/or medium 720, such as the pre-PRS module 722.

At block 806, the receiving UE determines that a temporal separation between the first ranging session and the second ranging session is less than a predetermined time threshold, as discussed at stage 2 of FIG. 6. A means for determining that a temporal separation between the first ranging session and the second ranging session is less than a predetermined time threshold may be, e.g., the one or more processors 702 with dedicated hardware or implementing executable code or software instructions in memory 704 and/or medium 720, such as the separation determination module 724. For example, the receiving UE may determine that a difference between a first time of reception of the first initial message and a second time of reception of the second initial message is less than the predetermined time threshold. A means for determining that a difference between a first time of reception of the first initial message and a second time of reception of the second initial message is less than the predetermined time threshold may be, e.g., the one or more processors 702 with dedicated hardware or implementing executable code or software instructions in memory 704 and/or medium 720, such as the separation determination module 724.

At block 808, the receiving UE separates separating available ranging signal properties into a first set for the first ranging sessions and a second set for the second ranging session, wherein the first set of ranging signal properties and the second set of ranging signal properties are different, as discussed at stage 3 of FIG. 6. The available ranging signal properties, for example, may be provided by the first UE in the first initial message and by the second UE in the second initial message. A means for separating available ranging signal properties into a first set for the first ranging sessions and a second set for the second ranging session, wherein the first set of ranging signal properties and the second set of ranging signal properties are different may be, e.g., the one or more processors 702 with dedicated hardware or implementing executable code or software instructions in memory 704 and/or medium 720, such as the ranging signal property separation module 726.

At block 810, the receiving UE transmit a first response messages to the first UE comprising the first set of ranging signal properties and a second response message to the second UE comprising the second set of ranging signal properties, as discussed at stages 4A and 4B of FIG. 6. A means for transmitting a first response messages to the first UE comprising the first set of ranging signal properties and a second response message to the second UE comprising the second set of ranging signal properties may be, e.g., the transceiver 714 and the one or more processors 702 with dedicated hardware or implementing executable code or software instructions in memory 704 and/or medium 720, such as the pre-PRS module 722.

At block 812, the receiving UE performs the first ranging session with the first UE using the first set of ranging signal properties and the second ranging session with the second UE using the second set of ranging signal properties, as discussed at stages 5A, 5B, 6A, 6B, 7A, 7B, 8A, 8B, and 9C of FIG. 6. The receiving UE, for example, may receive and broadcast ranging signals on an unlicensed spectrum. A means for performing the first ranging session with the first UE using the first set of ranging signal properties and the second ranging session with the second UE using the second set of ranging signal properties may be, e.g., the transceiver 714 and the one or more processors 702 with dedicated hardware or implementing executable code or software instructions in memory 704 and/or medium 720, such as the PRS module 728, the post-PRS module 730 and ranging module 732. For example, the receiving UE may perform the first ranging session with the first UE using the first set of ranging signal properties and the second ranging session with the second UE using the second set of ranging signal properties by receiving a first ranging signal that is broadcast from the first UE using the first set of available ranging signal properties, e.g., as discussed at stage 5A of FIG. 6; broadcasting a second ranging signal to the first UE using the first set of ranging signal properties, e.g., as discussed at stage 6A of FIG. 6; receiving a third ranging signal that is broadcast from the second UE using the second set of ranging signal properties, e.g., as discussed at stage 5B of FIG. 6; and broadcasting a fourth ranging signal to the second UE using the second set of ranging signal properties, e.g., as discussed at stage 6B of FIG. 6. A means for receiving a first ranging signal that is broadcast from the first UE using the first set of available ranging signal properties, a means for broadcasting a second ranging signal to the first UE using the first set of ranging signal properties, a means for receiving a third ranging signal that is broadcast from the second UE using the second set of ranging signal properties, and a means for broadcasting a fourth ranging signal to the second UE using the second set of ranging signal properties may be, e.g., may be, e.g., the transceiver 714 and the one or more processors 702 with dedicated hardware or implementing executable code or software instructions in memory 704 and/or medium 720, such as the PRS module 728.

In some implementations, the receiving UE may further determine whether a geographic separation between the first UE and the second UE is less than a predetermined distance threshold, e.g., as discussed at stage 2 in FIG. 6. For example, the receiving UE may separate the available ranging signal properties is performed when both the temporal separation is less than the predetermined time threshold and the geographic separation is less than the predetermined distance threshold, e.g., as discussed at stage 3 of FIG. 6. A means for determining whether a geographic separation between the first UE and the second UE is less than a predetermined distance threshold may be, e.g., the one or more processors 702 with dedicated hardware or implementing executable code or software instructions in memory 704 and/or medium 720, such as the separation determination module 724. By way of example, the first initial message may include a first location of the first UE and the second initial message may include a second location of the second UE and the receiving UE may determine whether the geographic separation is less than the predetermined distance threshold by determining that a difference between the first location and the second location is less than the predetermined distance threshold. A means for determining that a difference between the first location and the second location is less than the predetermined distance threshold may be, e.g., the one or more processors 702 with dedicated hardware or implementing executable code or software instructions in memory 704 and/or medium 720, such as the separation determination module 724.

In one implementation, the available ranging signal properties may comprise frequency bandwidth, and the receiving UE may separate the available ranging signal properties by dividing the frequency bandwidth between the first UE and the second UE, e.g., as discussed at stage 3 of FIG. 6. A means for dividing the frequency bandwidth between the first UE and the second UE may be, e.g., the one or more processors 702 with dedicated hardware or implementing executable code or software instructions in memory 704 and/or medium 720, such as the ranging signal property separation module 726.

In one implementation, the available ranging signal properties may comprise ranging signal timing instances, and the receiving UE may separate available ranging signal properties by providing the first set of ranging signal properties with a first set of ranging signal timing instances and providing the second set of ranging signal properties with a second set of ranging signal timing instances, e.g., as discussed at stage 3 of FIG. 6. A means for providing the first set of ranging signal properties with a first set of ranging signal timing instances and providing the second set of ranging signal properties with a second set of ranging signal timing instances may be, e.g., the one or more processors 702 with dedicated hardware or implementing executable code or software instructions in memory 704 and/or medium 720, such as the ranging signal property separation module 726.

In one implementation, the available ranging signal properties may comprise ranging signal identifiers, and the receiving UE may separate available ranging signal properties by providing the first set of ranging signal properties with a first ranging signal identifier and providing the second set of ranging signal properties with a second ranging signal identifier, e.g., as discussed at stage 3 of FIG. 6. A means for dividing the frequency bandwidth between the first UE and the second UE may be, e.g., the one or more processors 702 with dedicated hardware or implementing executable code or software instructions in memory 704 and/or medium 720, such as the ranging signal property separation module 726.

Figure 9:
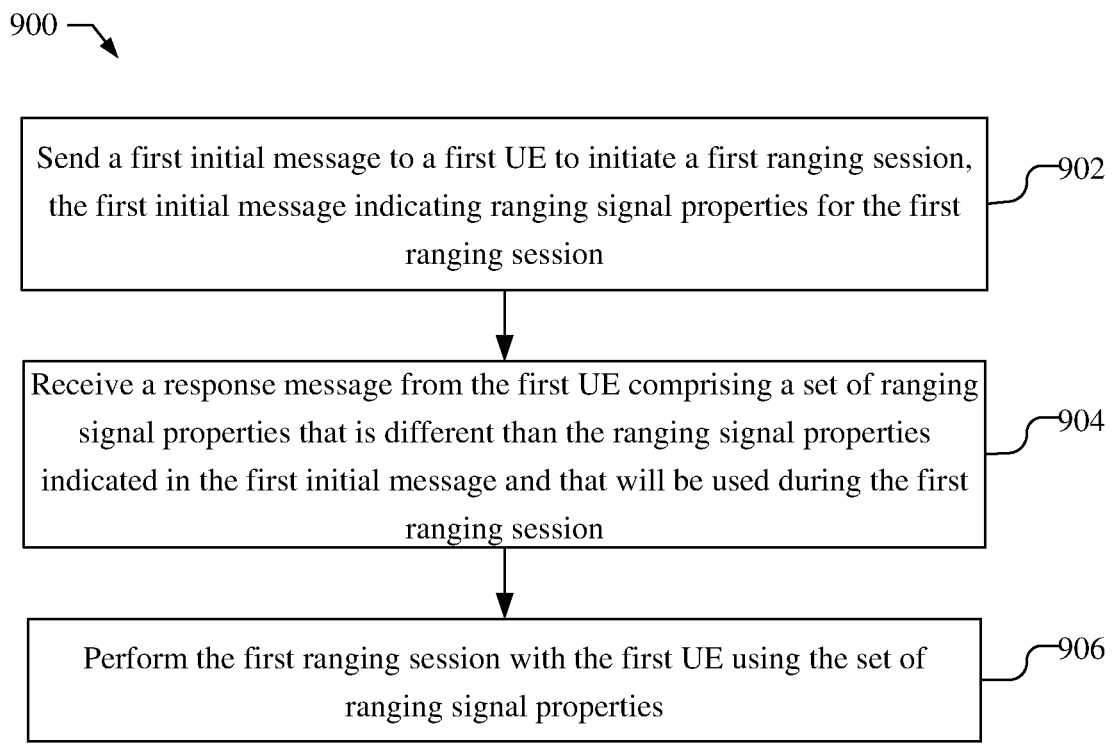
FIG. 9 is a flow chart illustrating a method of ranging between UEs performed by an initiating UE in a ranging session.

FIG. 9 is a flow chart 900 illustrating a method of ranging between user equipments (UEs) performed by an initiating UE in a ranging session, such as UE1 602.

At block 902, the initiating UE sends a first initial message to a first UE to initiate a first ranging session, the first initial message indicating ranging signal properties for the first ranging session, as discussed at stage 1A of FIG. 6. A means for sending a first initial message to a first UE to initiate a first ranging session, the first initial message indicating ranging signal properties for the first ranging session may be, e.g., the transceiver 714 and the one or more processors 702 with dedicated hardware or implementing executable code or software instructions in memory 704 and/or medium 720, such as the pre-PRS module 722.

At block 904, the initiating UE receives a response message from the first UE comprising a set of ranging signal properties that is different than the ranging signal properties indicated in the first initial message and that will be used during the first ranging session, e.g., as discussed at stage 4A of FIG. 6. A means for receiving a response message from the first UE comprising a set of ranging signal properties that is different than the ranging signal properties indicated in the first initial message and that will be used during the first ranging session may be, e.g., the transceiver 714 and the one or more processors 702 with dedicated hardware or implementing executable code or software instructions in memory 704 and/or medium 720, such as the pre-PRS module 722.

At block 906, the initiating UE performs the first ranging session with the first UE using the set of ranging signal properties, e.g., as discussed at stages 5A, 6A, 7A, 8A, and 9A of FIG. 6. The initiating UE, for example, may receive and broadcast ranging signals on an unlicensed spectrum. A means for performing the first ranging session with the first UE using the set of ranging signal properties may be, e.g., the transceiver 714 and the one or more processors 702 with dedicated hardware or implementing executable code or software instructions in memory 704 and/or medium 720, such as the PRS module 728, the post-PRS module 730, and ranging module 732.

In one implementation, the ranging signal properties indicated in the first initial message to the first UE may comprise frequency bandwidth, and the set of ranging signal properties received from the first UE may comprise a subset of the frequency bandwidth, e.g., as discussed at stages 3 and 4A of FIG. 6.

In one implementation, the ranging signal properties indicated in the first initial message to the first UE may comprise ranging signal timing instances, and the set of ranging signal properties received from the first UE may comprise different ranging signal timing instances, e.g., as discussed at stages 3 and 4A of FIG. 6.

In one implementation, the ranging signal properties indicated in the first initial message to the first UE may comprise a ranging signal identifier, and the set of ranging signal properties received from the first UE may comprise a different ranging signal identifier, e.g., as discussed at stages 3 and 4A of FIG. 6.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures, or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Implementation examples are described in the following numbered clauses:

1. A method of ranging between user equipments (UEs) performed by a receiving UE, the method comprising:
   receiving a first initial message from a first UE to initiate a first ranging session;
   receiving a second initial message from a second UE to initiate a second ranging session;
   determining that a temporal separation between the first ranging session and the second ranging session is less than a predetermined time threshold;
   separating available ranging signal properties into a first set for the first ranging sessions and a second set for the second ranging session, wherein the first set of ranging signal properties and the second set of ranging signal properties are different;

transmitting a first response messages to the first UE comprising the first set of ranging signal properties and a second response message to the second UE comprising the second set of ranging signal properties; and performing the first ranging session with the first UE using the first set of ranging signal properties and the second ranging session with the second UE using the second set of ranging signal properties.

2. The method of clause 1, wherein determining that the temporal separation between the first ranging session and the second ranging session is less than the predetermined time threshold comprises determining that a difference between a first time of reception of the first initial message and a second time of reception of the second initial message is less than the predetermined time threshold.

3. The method of either of clauses 1 or 2, further comprising determining whether a geographic separation between the first UE and the second UE is less than a predetermined distance threshold.

4. The method of clause 3, wherein separating the available ranging signal properties is performed when both the temporal separation is less than the predetermined time threshold and the geographic separation is less than the predetermined distance threshold.

5. The method of clause 3, wherein the first initial message comprises a first location of the first UE and the second initial message comprises a second location of the second UE and wherein determining whether the geographic separation is less than the predetermined distance threshold comprises determining that a difference between the first location and the second location is less than the predetermined distance threshold.

6. The method of any of clauses 1-5, wherein the available ranging signal properties are provided by the first UE in the first initial message and by the second UE in the second initial message.

7. The method of any of clauses 1-6, wherein the available ranging signal properties comprises frequency bandwidth, and wherein separating the available ranging signal properties comprises dividing the frequency bandwidth between the first UE and the second UE.

8. The method of any of clauses 1-7, wherein the available ranging signal properties comprises ranging signal timing instances, and wherein separating available ranging signal properties comprises providing the first set of ranging signal properties with a first set of ranging signal timing instances and providing the second set of ranging signal properties with a second set of ranging signal timing instances.

9. The method of any of clauses 1-8, wherein the available ranging signal properties comprises ranging signal identifiers, and wherein separating available ranging signal properties comprises providing the first set of ranging signal properties with a first ranging signal identifier and providing the second set of ranging signal properties with a second ranging signal identifier.

10. The method of any of clauses 1-9, wherein performing the first ranging session with the first UE using the first set of ranging signal properties and the second ranging session with the second UE using the second set of ranging signal properties comprises receiving and broadcasting ranging signals on an unlicensed spectrum.

11. The method of any of clauses 1-10, wherein performing the first ranging session with the first UE using the first set of ranging signal properties and the second ranging session with the second UE using the second set of ranging signal properties comprises:

receiving a first ranging signal that is broadcast from the first UE using the first set of available ranging signal properties;

broadcasting a second ranging signal to the first UE using the first set of ranging signal properties;

receiving a third ranging signal that is broadcast from the second UE using the second set of ranging signal properties; and broadcasting a fourth ranging signal to the second UE using the second set of ranging signal properties.

12. A user equipment (UE) configured for ranging between UEs, the UE comprising:

a wireless transceiver configured to wirelessly communicate with entities in a wireless network;

at least one memory; and at least one processor coupled to the wireless transceiver and the at least one memory, wherein the at least one processor is configured to:

receive a first initial message from a first UE to initiate a first ranging session;

receive a second initial message from a second UE to initiate a second ranging session;

determine that a temporal separation between the first ranging session and the second ranging session is less than a predetermined time threshold;

separate available ranging signal properties into a first set for the first ranging sessions and a second set for the second ranging session, wherein the first set of ranging signal properties and the second set of ranging signal properties are different;

transmit a first response messages to the first UE comprising the first set of ranging signal properties and a second response message to the second UE comprising the second set of ranging signal properties; and perform the first ranging session with the first UE using the first set of ranging signal properties and the second ranging session with the second UE using the second set of ranging signal properties.

13. The UE of clause 12, wherein the at least one processor is configured to determine that the temporal separation between the first ranging session and the second ranging session is less than the predetermined time threshold by being configured to determine that a difference between a first time of reception of the first initial message and a second time of reception of the second initial message is less than the predetermined time threshold.

14. The UE of either of clauses 12 or 13, wherein the at least one processor is further configured to determine whether a geographic separation between the first UE and the second UE is less than a predetermined distance threshold.

15. The UE of clause 14, wherein the at least one processor is configured to separate the available ranging signal properties when both the temporal separation is less than the predetermined time threshold and the geographic separation is less than the predetermined distance threshold.

16. The UE of clause 14, wherein the first initial message comprises a first location of the first UE and the second initial message comprises a second location of the second UE and wherein the at least one processor is configured to determine whether the geographic separation is less than the predetermined distance threshold by being configured to determine that a difference between the first location and the second location is less than the predetermined distance threshold.

17. The UE of any of clauses 12-16, wherein the available ranging signal properties are provided by the first UE in the first initial message and by the second UE in the second initial message.

18. The UE of any of clauses 12-17, wherein the available ranging signal properties comprises frequency bandwidth, and wherein the at least one processor is configured to separate the available ranging signal properties by being configured to divide the frequency bandwidth between the first UE and the second UE.

19. The UE of any of clauses 12-18, wherein the available ranging signal properties comprises ranging signal timing instances, and wherein the at least one processor is configured to separate available ranging signal properties by being configured to provide the first set of ranging signal properties with a first set of ranging signal timing instances and provide the second set of ranging signal properties with a second set of ranging signal timing instances.

20. The UE of any of clauses 12-19, wherein the available ranging signal properties comprises ranging signal identifiers, and wherein the at least one processor is configured to separate available ranging signal properties by being configured to provide the first set of ranging signal properties with a first ranging signal identifier and provide the second set of ranging signal properties with a second ranging signal identifier.

21. The UE of any of clauses 12-20, wherein the at least one processor is configured to perform the first ranging session with the first UE using the first set of ranging signal properties and the second ranging session with the second UE using the second set of ranging signal properties by being configured to receive and broadcast ranging signals on an unlicensed spectrum.

22. The UE of any of clauses 12-21, wherein the at least one processor is configured to perform the first ranging session with the first UE using the first set of ranging signal properties and the second ranging session with the second UE using the second set of ranging signal properties by being configured to:
  receive a first ranging signal that is broadcast from the first UE using the first set of available ranging signal properties;
  broadcast a second ranging signal to the first UE using the first set of ranging signal properties;
  receive a third ranging signal that is broadcast from the second UE using the second set of ranging signal properties; and
  broadcast a fourth ranging signal to the second UE using the second set of ranging signal properties.

23. A user equipment (UE) configured for ranging between UEs, the UE comprising:
  means for receiving a first initial message from a first UE to initiate a first ranging session;
  means for receiving a second initial message from a second UE to initiate a second ranging session;
  means for determining that a temporal separation between the first ranging session and the second ranging session is less than a predetermined time threshold;
  means for separating available ranging signal properties into a first set for the first ranging sessions and a second set for the second ranging session, wherein the first set of ranging signal properties and the second set of ranging signal properties are different;
  means for transmitting a first response messages to the first UE comprising the first set of ranging signal properties and a second response message to the second UE comprising the second set of ranging signal properties; and
  means for performing the first ranging session with the first UE using the first set of ranging signal properties and the second ranging session with the second UE using the second set of ranging signal properties.

24. The UE of clause 23, further comprising means for determining whether a geographic separation between the first UE and the second UE is less than a predetermined distance threshold, wherein the means for separating the available ranging signal properties separates the available ranging signal properties when both the temporal separation is less than the predetermined time threshold and the geographic separation is less than the predetermined distance threshold.

25. The UE of either of clauses 23 or 24, wherein the available ranging signal properties comprises frequency bandwidth, and wherein the means for separating the available ranging signal properties comprises means for dividing the frequency bandwidth between the first UE and the second UE.

26. The UE of any of clauses 23-25, wherein the available ranging signal properties comprises ranging signal timing instances, and wherein the means for separating available ranging signal properties comprises means for providing the first set of ranging signal properties with a first set of ranging signal timing instances and providing the second set of ranging signal properties with a second set of ranging signal timing instances.

27. The UE of any of clauses 23-26, wherein the available ranging signal properties comprises ranging signal identifiers, and wherein the means for separating available ranging signal properties comprises means for providing the first set of ranging signal properties with a first ranging signal identifier and providing the second set of ranging signal properties with a second ranging signal identifier.

28. A non-transitory storage medium including program code stored thereon, the program code is operable to configure at least one processor in a user equipment (UE) for ranging between UEs, comprising:
  program code to receive a first initial message from a first UE to initiate a first ranging session;
  program code to receive a second initial message from a second UE to initiate a second ranging session;
  program code to determine that a temporal separation between the first ranging session and the second ranging session is less than a predetermined time threshold;
  program code to separate available ranging signal properties into a first set for the first ranging sessions and a second set for the second ranging session, wherein the first set of ranging signal properties and the second set of ranging signal properties are different;
  program code to transmit a first response messages to the first UE comprising the first set of ranging signal properties and a second response message to the second UE comprising the second set of ranging signal properties; and
  program code to perform the first ranging session with the first UE using the first set of ranging signal properties and the second ranging session with the second UE using the second set of ranging signal properties.

29. The non-transitory storage medium of clause 28, further comprising program code to determine whether a geographic separation between the first UE and the second UE is less than a predetermined distance threshold, wherein the program code to separate the available ranging signal properties separates the available ranging signal properties when both the temporal separation is less than the predetermined time threshold and the geographic separation is less than the predetermined distance threshold.

30. The non-transitory storage medium of either of clauses 28 or 29, wherein the available ranging signal properties comprises one or more of frequency bandwidth, ranging signal timing instances, and ranging signal identifiers, or a combination thereof, and wherein program code to separate the available ranging signal properties comprises one or more program code to divide the frequency bandwidth between the first UE and the second UE, program code to provide the first set of ranging signal properties with a first set of ranging signal timing instances and provide the second set of ranging signal properties with a second set of ranging signal timing instances, program code to provide the first set of ranging signal properties with a first ranging signal identifier and provide the second set of ranging signal properties with a second ranging signal identifier, or a combination thereof.

31. A method of ranging between user equipments (UEs) performed by an initiating UE, the method comprising:
  sending a first initial message to a first UE to initiate a first ranging session, the first initial message indicating ranging signal properties for the first ranging session;
  receiving a response message from the first UE comprising a set of ranging signal properties that is different than the ranging signal properties indicated in the first initial message and that will be used during the first ranging session; and
  performing the first ranging session with the first UE using the set of ranging signal properties.

32. The method of clause 31, wherein the ranging signal properties indicated in the first initial message to the first UE comprises frequency bandwidth, and wherein the set of ranging signal properties received from the first UE comprises a subset of the frequency bandwidth.

33. The method of either of clauses 31 or 32, wherein the ranging signal properties indicated in the first initial message to the first UE comprises ranging signal timing instances, and wherein the set of ranging signal properties received from the first UE comprises different ranging signal timing instances.

34. The method of any of clauses 31-33, wherein the ranging signal properties indicated in the first initial message to the first UE comprises a ranging signal identifier, and wherein the set of ranging signal properties received from the first UE comprise a different ranging signal identifier.

35. The method of any of clauses 31-34, wherein performing the first ranging session with the first UE using the set of ranging signal properties comprises receiving and broadcasting ranging signals on an unlicensed spectrum.

36. A user equipment (UE) configured for ranging between UEs, the UE comprising:
  a wireless transceiver configured to wirelessly communicate with entities in a wireless network;
  at least one memory; and
  at least one processor coupled to the wireless transceiver and the at least one memory, wherein the at least one processor is configured to:
    send a first initial message to a first UE to initiate a first ranging session, the first initial message indicating ranging signal properties for the first ranging session;
    receive a response message from the first UE comprising a set of ranging signal properties that is different than the ranging signal properties indicated in the first initial message and that will be used during the first ranging session; and
    perform the first ranging session with the first UE using the set of ranging signal properties.

37. The UE of clause 36, wherein the ranging signal properties indicated in the first initial message to the first UE comprises frequency bandwidth, and wherein the set of ranging signal properties received from the first UE comprises a subset of the frequency bandwidth.

38. The UE of either of clauses 36 or 37, wherein the ranging signal properties indicated in the first initial message to the first UE comprises ranging signal timing instances, and wherein the set of ranging signal properties received from the first UE comprises different ranging signal timing instances.

39. The UE of any of clauses 36-38, wherein the ranging signal properties indicated in the first initial message to the first UE comprises a ranging signal identifier, and wherein the set of ranging signal properties received from the first UE comprise a different ranging signal identifier.

40. The UE of any of clauses 36-38, wherein the at least one processor is configured to perform the first ranging session with the first UE using the set of ranging signal properties by being configured to receive and broadcast ranging signals on an unlicensed spectrum.

41. A user equipment (UE) configured for ranging between UEs, the UE comprising:
  means for sending a first initial message to a first UE to initiate a first ranging session, the first initial message indicating ranging signal properties for the first ranging session;
  means for receiving a response message from the first UE comprising a set of ranging signal properties that is different than the ranging signal properties indicated in the first initial message and that will be used during the first ranging session; and
  means for performing the first ranging session with the first UE using the set of ranging signal properties.

42. The UE of clause 41, wherein the ranging signal properties indicated in the first initial message to the first UE comprises frequency bandwidth, and wherein the set of ranging signal properties received from the first UE comprises a subset of the frequency bandwidth.

43. The UE of either of clauses 41 or 42, wherein the ranging signal properties indicated in the first initial message to the first UE comprises ranging signal timing instances, and wherein the set of ranging signal properties received from the first UE comprises different ranging signal timing instances.

44. The UE of any of clauses 41-43, wherein the ranging signal properties indicated in the first initial message to the first UE comprises a ranging signal identifier, and wherein the set of ranging signal properties received from the first UE comprise a different ranging signal identifier.

45. The UE of any of clauses 41-44, wherein the means for performing the first ranging session with the first UE using the set of ranging signal properties comprises means for receiving and broadcasting ranging signals on an unlicensed spectrum.

46. A non-transitory storage medium including program code stored thereon, the program code is operable to configure at least one processor in a user equipment (UE) for ranging between UEs, the UE comprising:

program code to send a first initial message to a first UE to initiate a first ranging session, the first initial message indicating ranging signal properties for the first ranging session;
program code to receive a response message from the first UE comprising a set of ranging signal properties that is different than the ranging signal properties indicated in the first initial message and that will be used during the first ranging session; and
program code to perform the first ranging session with the first UE using the set of ranging signal properties.

47. The non-transitory storage medium of clause 46, wherein the ranging signal properties indicated in the first initial message to the first UE comprises frequency bandwidth, and wherein the set of ranging signal properties received from the first UE comprises a subset of the frequency bandwidth.

48. The non-transitory storage medium of either of clauses 46 or 47, wherein the ranging signal properties indicated in the first initial message to the first UE comprises ranging signal timing instances, and wherein the set of ranging signal properties received from the first UE comprises different ranging signal timing instances.

49. The non-transitory storage medium of any of clauses 46-48, wherein the ranging signal properties indicated in the first initial message to the first UE comprises a ranging signal identifier, and wherein the set of ranging signal properties received from the first UE comprise a different ranging signal identifier.

50. The non-transitory storage medium of any of clauses 46-49, wherein the program code to perform the first ranging session with the first UE using the set of ranging signal properties comprises program code to receive and broadcast ranging signals on an unlicensed spectrum.

Therefore, it is intended that claimed subject matter not be limited to the particular examples disclosed, but that such claimed subject matter may also include all aspects falling within the scope of appended claims, and equivalents thereof.

What is claimed is:

1. A method of ranging between user equipments (UEs) performed by a receiving UE, the method comprising:
    receiving a first initial message from a first UE to initiate a first ranging session;
    receiving a second initial message from a second UE to initiate a second ranging session;
    determining that a temporal separation between the first ranging session and the second ranging session is less than a predetermined time threshold;
    separating available ranging signal properties into a first set for the first ranging sessions and a second set for the second ranging session, wherein the first set of ranging signal properties and the second set of ranging signal properties are different;
    transmitting a first response messages to the first UE comprising the first set of ranging signal properties and a second response message to the second UE comprising the second set of ranging signal properties; and
    performing the first ranging session with the first UE using the first set of ranging signal properties and the second ranging session with the second UE using the second set of ranging signal properties.

2. The method of claim 1, wherein determining that the temporal separation between the first ranging session and the second ranging session is less than the predetermined time threshold comprises determining that a difference between a first time of reception of the first initial message and a second time of reception of the second initial message is less than the predetermined time threshold.

3. The method of claim 1, further comprising determining whether a geographic separation between the first UE and the second UE is less than a predetermined distance threshold.

4. The method of claim 3, wherein separating the available ranging signal properties is performed when both the temporal separation is less than the predetermined time threshold and the geographic separation is less than the predetermined distance threshold.

5. The method of claim 3, wherein the first initial message comprises a first location of the first UE and the second initial message comprises a second location of the second UE and wherein determining whether the geographic separation is less than the predetermined distance threshold comprises determining that a difference between the first location and the second location is less than the predetermined distance threshold.

6. The method of claim 1, wherein the available ranging signal properties are provided by the first UE in the first initial message and by the second UE in the second initial message.

7. The method of claim 1, wherein the available ranging signal properties comprises frequency bandwidth, and wherein separating the available ranging signal properties comprises dividing the frequency bandwidth between the first UE and the second UE.

8. The method of claim 1, wherein the available ranging signal properties comprises ranging signal timing instances, and wherein separating available ranging signal properties comprises providing the first set of ranging signal properties with a first set of ranging signal timing instances and providing the second set of ranging signal properties with a second set of ranging signal timing instances.

9. The method of claim 1, wherein the available ranging signal properties comprises ranging signal identifiers, and wherein separating available ranging signal properties comprises providing the first set of ranging signal properties with a first ranging signal identifier and providing the second set of ranging signal properties with a second ranging signal identifier.

10. The method of claim 1, wherein performing the first ranging session with the first UE using the first set of ranging signal properties and the second ranging session with the second UE using the second set of ranging signal properties comprises receiving and broadcasting ranging signals on an unlicensed spectrum.

11. The method of claim 1, wherein performing the first ranging session with the first UE using the first set of ranging signal properties and the second ranging session with the second UE using the second set of ranging signal properties comprises:
    receiving a first ranging signal that is broadcast from the first UE using the first set of available ranging signal properties;
    broadcasting a second ranging signal to the first UE using the first set of ranging signal properties;
    receiving a third ranging signal that is broadcast from the second UE using the second set of ranging signal properties; and
    broadcasting a fourth ranging signal to the second UE using the second set of ranging signal properties.

12. A user equipment (UE) configured for ranging between UEs, the UE comprising:
    a wireless transceiver configured to wirelessly communicate with entities in a wireless network;

at least one memory; and at least one processor coupled to the wireless transceiver and the at least one memory, wherein the at least one processor is configured to:

receive a first initial message from a first UE to initiate a first ranging session;

receive a second initial message from a second UE to initiate a second ranging session;

determine that a temporal separation between the first ranging session and the second ranging session is less than a predetermined time threshold;

separate available ranging signal properties into a first set for the first ranging sessions and a second set for the second ranging session, wherein the first set of ranging signal properties and the second set of ranging signal properties are different;

transmit a first response messages to the first UE comprising the first set of ranging signal properties and a second response message to the second UE comprising the second set of ranging signal properties; and perform the first ranging session with the first UE using the first set of ranging signal properties and the second ranging session with the second UE using the second set of ranging signal properties.

13. The UE of claim 12, wherein the at least one processor is configured to determine that the temporal separation between the first ranging session and the second ranging session is less than the predetermined time threshold by being configured to determine that a difference between a first time of reception of the first initial message and a second time of reception of the second initial message is less than the predetermined time threshold.

14. The UE of claim 12, wherein the at least one processor is further configured to determine whether a geographic separation between the first UE and the second UE is less than a predetermined distance threshold.

15. The UE of claim 14, wherein the at least one processor is configured to separate the available ranging signal properties when both the temporal separation is less than the predetermined time threshold and the geographic separation is less than the predetermined distance threshold.

16. The UE of claim 14, wherein the first initial message comprises a first location of the first UE and the second initial message comprises a second location of the second UE and wherein the at least one processor is configured to determine whether the geographic separation is less than the predetermined distance threshold by being configured to determine that a difference between the first location and the second location is less than the predetermined distance threshold.

17. The UE of claim 12, wherein the available ranging signal properties are provided by the first UE in the first initial message and by the second UE in the second initial message.

18. The UE of claim 12, wherein the available ranging signal properties comprises frequency bandwidth, and wherein the at least one processor is configured to separate the available ranging signal properties by being configured to divide the frequency bandwidth between the first UE and the second UE.

19. The UE of claim 12, wherein the available ranging signal properties comprises ranging signal timing instances, and wherein the at least one processor is configured to separate available ranging signal properties by being configured to provide the first set of ranging signal properties with a first set of ranging signal timing instances and provide the second set of ranging signal properties with a second set of ranging signal timing instances.

20. The UE of claim 12, wherein the available ranging signal properties comprises ranging signal identifiers, and wherein the at least one processor is configured to separate available ranging signal properties by being configured to provide the first set of ranging signal properties with a first ranging signal identifier and provide the second set of ranging signal properties with a second ranging signal identifier.

21. The UE of claim 12, wherein the at least one processor is configured to perform the first ranging session with the first UE using the first set of ranging signal properties and the second ranging session with the second UE using the second set of ranging signal properties by being configured to receive and broadcast ranging signals on an unlicensed spectrum.

22. The UE of claim 12, wherein the at least one processor is configured to perform the first ranging session with the first UE using the first set of ranging signal properties and the second ranging session with the second UE using the second set of ranging signal properties by being configured to:

receive a first ranging signal that is broadcast from the first UE using the first set of available ranging signal properties;

broadcast a second ranging signal to the first UE using the first set of ranging signal properties;

receive a third ranging signal that is broadcast from the second UE using the second set of ranging signal properties; and broadcast a fourth ranging signal to the second UE using the second set of ranging signal properties.

23. A user equipment (UE) configured for ranging between UEs, the UE comprising:

means for receiving a first initial message from a first UE to initiate a first ranging session;

means for receiving a second initial message from a second UE to initiate a second ranging session;

means for determining that a temporal separation between the first ranging session and the second ranging session is less than a predetermined time threshold;

means for separating available ranging signal properties into a first set for the first ranging sessions and a second set for the second ranging session, wherein the first set of ranging signal properties and the second set of ranging signal properties are different;

means for transmitting a first response messages to the first UE comprising the first set of ranging signal properties and a second response message to the second UE comprising the second set of ranging signal properties; and means for performing the first ranging session with the first UE using the first set of ranging signal properties and the second ranging session with the second UE using the second set of ranging signal properties.

24. The UE of claim 23, further comprising means for determining whether a geographic separation between the first UE and the second UE is less than a predetermined distance threshold, wherein the means for separating the available ranging signal properties separates the available ranging signal properties when both the temporal separation is less than the predetermined time threshold and the geographic separation is less than the predetermined distance threshold.

25. The UE of claim 23, wherein the available ranging signal properties comprises frequency bandwidth, and wherein the means for separating the available ranging signal properties comprises means for dividing the frequency bandwidth between the first UE and the second UE.

26. The UE of claim 23, wherein the available ranging signal properties comprises ranging signal timing instances, and wherein the means for separating available ranging signal properties comprises means for providing the first set of ranging signal properties with a first set of ranging signal timing instances and providing the second set of ranging signal properties with a second set of ranging signal timing instances.

27. The UE of claim 23, wherein the available ranging signal properties comprises ranging signal identifiers, and wherein the means for separating available ranging signal properties comprises means for providing the first set of ranging signal properties with a first ranging signal identifier and providing the second set of ranging signal properties with a second ranging signal identifier.

28. A method of ranging between user equipments (UEs) performed by an initiating UE, the method comprising:
sending a first initial message to a first UE to initiate a first ranging session, the first initial message indicating ranging signal properties for the first ranging session, wherein the ranging signal properties indicated in the first initial message comprise frequency bandwidth;
receiving a response message from the first UE comprising a set of ranging signal properties that is different than the ranging signal properties indicated in the first initial message and that will be used during the first ranging session, wherein the set of ranging signal properties received from the first UE comprises a subset of the frequency bandwidth; and
performing the first ranging session with the first UE using the set of ranging signal properties.

29. The method of claim 28, wherein the ranging signal properties indicated in the first initial message to the first UE comprises ranging signal timing instances, and wherein the set of ranging signal properties received from the first UE comprises different ranging signal timing instances.

30. The method of claim 28, wherein the ranging signal properties indicated in the first initial message to the first UE comprises a ranging signal identifier, and wherein the set of ranging signal properties received from the first UE comprise a different ranging signal identifier.

31. The method of claim 28, wherein performing the first ranging session with the first UE using the set of ranging signal properties comprises receiving and broadcasting ranging signals on an unlicensed spectrum.

32. A user equipment (UE) configured for ranging between UEs, the UE comprising:
a wireless transceiver configured to wirelessly communicate with entities in a wireless network;
at least one memory; and
at least one processor coupled to the wireless transceiver and the at least one memory, wherein the at least one processor is configured to:
send a first initial message to a first UE to initiate a first ranging session, the first initial message indicating ranging signal properties for the first ranging session, wherein the ranging signal properties indicated in the first initial message comprise frequency bandwidth;
receive a response message from the first UE comprising a set of ranging signal properties that is different than the ranging signal properties indicated in the first initial message and that will be used during the first ranging session, wherein the set of ranging signal properties received from the first UE comprises a subset of the frequency bandwidth; and
perform the first ranging session with the first UE using the set of ranging signal properties.

33. The UE of claim 32, wherein the ranging signal properties indicated in the first initial message to the first UE comprises ranging signal timing instances, and wherein the set of ranging signal properties received from the first UE comprises different ranging signal timing instances.

34. The UE of claim 32, wherein the ranging signal properties indicated in the first initial message to the first UE comprises a ranging signal identifier, and wherein the set of ranging signal properties received from the first UE comprise a different ranging signal identifier.

35. The UE of claim 32, wherein the at least one processor is configured to perform the first ranging session with the first UE using the set of ranging signal properties by being configured to receive and broadcast ranging signals on an unlicensed spectrum.

36. A user equipment (UE) configured for ranging between UEs, the UE comprising:
means for sending a first initial message to a first UE to initiate a first ranging session, the first initial message indicating ranging signal properties for the first ranging session, wherein the ranging signal properties indicated in the first initial message comprise frequency bandwidth;
means for receiving a response message from the first UE comprising a set of ranging signal properties that is different than the ranging signal properties indicated in the first initial message and that will be used during the first ranging session, wherein the set of ranging signal properties received from the first UE comprises a subset of the frequency bandwidth; and
means for performing the first ranging session with the first UE using the set of ranging signal properties.

37. The UE of claim 36, wherein the ranging signal properties indicated in the first initial message to the first UE comprises ranging signal timing instances, and wherein the set of ranging signal properties received from the first UE comprises different ranging signal timing instances.

38. The UE of claim 36, wherein the ranging signal properties indicated in the first initial message to the first UE comprises a ranging signal identifier, and wherein the set of ranging signal properties received from the first UE comprise a different ranging signal identifier.

39. The UE of claim 36, wherein the means for performing the first ranging session with the first UE using the set of ranging signal properties comprises means for receiving and broadcasting ranging signals on an unlicensed spectrum.

* * * * *